(12) United States Patent
Giurlani et al.

(10) Patent No.: US 12,031,272 B2
(45) Date of Patent: *Jul. 9, 2024

(54) CALENDER FOR THE TREATMENT OF WEB-LIKE MATERIALS

(71) Applicant: FUTURA S.P.A., Capannori (IT)

(72) Inventors: Giovacchino Giurlani, Capannori (IT); Gionata Mazzoni, Vorno (IT)

(73) Assignee: FUTURA S.P.A., Capannori (IT)

( * ) Notice: Subject to any disclaimer, the term of this patent is extended or adjusted under 35 U.S.C. 154(b) by 270 days.

This patent is subject to a terminal disclaimer.

(21) Appl. No.: 17/425,793

(22) PCT Filed: Feb. 18, 2020

(86) PCT No.: PCT/IT2020/050032
§ 371 (c)(1),
(2) Date: Jul. 26, 2021

(87) PCT Pub. No.: WO2020/183504
PCT Pub. Date: Sep. 17, 2020

(65) Prior Publication Data
US 2022/0112642 A1   Apr. 14, 2022

(30) Foreign Application Priority Data

Mar. 14, 2019   (IT) ........................ 102019000003707

(51) Int. Cl.
*D21G 1/02* (2006.01)
*B29C 33/02* (2006.01)
(Continued)

(52) U.S. Cl.
CPC ......... *D21G 1/0293* (2013.01); *B29C 33/026* (2013.01); *B29C 33/044* (2013.01);
(Continued)

(58) Field of Classification Search
CPC .................. B31F 2201/0776; D21G 1/0293
See application file for complete search history.

(56) References Cited

U.S. PATENT DOCUMENTS

| 1,107,737 A | * | 8/1914 | Witham et al. ...... D21G 9/0036 38/52 |
| 3,507,943 A | | 4/1970 | Such et al. |

(Continued)

FOREIGN PATENT DOCUMENTS

| CN | 203557611 U | * | 4/2014 |
| CN | 204585671 U | * | 8/2015 |

(Continued)

OTHER PUBLICATIONS

International Search Report issued on Jun. 4, 2020 in corresponding International Application No. PCT/IT2020/050032; 3 pages.

*Primary Examiner* — Atul P. Khare
(74) *Attorney, Agent, or Firm* — Maier & Maier, PLLC

(57) ABSTRACT

Calender for the treatment of web-like materials, including a fixed structure supporting two heated rollers reciprocally arranged so as to form a nip traversable by web-like materials, where each roller has pins mounted on bearings. The structure includes two lower levers and two upper levers adapted for exerting on the bearings forces oriented according to not coinciding directions, each lever being connected with an actuator that controls its rotation around a horizontal axis to put it in a first engagement position of the respective bearing and in a second release position, such that in the second position of the levers the extraction of the rollers from the calender is allowed.

18 Claims, 29 Drawing Sheets

(51) Int. Cl.
  *B29C 33/04*   (2006.01)
  *D06C 15/02*   (2006.01)
  *D21G 1/00*   (2006.01)
  *B29C 43/24*   (2006.01)
  *B29C 43/46*   (2006.01)

(52) U.S. Cl.
  CPC ........... *D06C 15/02* (2013.01); *D21G 1/0006* (2013.01); *D21G 1/0226* (2013.01); *B29C 2043/464* (2013.01); *B29C 2043/466* (2013.01)

(56)       References Cited

U.S. PATENT DOCUMENTS

| | | | |
|---|---|---|---|
| 4,005,169 A | | 1/1977 | Cumbers |
| 5,761,945 A | * | 6/1998 | Vandenbroucke ... B23D 35/008 |
| | | | 72/181 |
| 6,782,808 B2 | * | 8/2004 | Downing ................ B29C 43/46 |
| | | | 100/41 |
| 7,481,643 B2 | * | 1/2009 | Catelli ...................... B31F 1/07 |
| | | | 425/188 |
| 8,381,646 B2 | * | 2/2013 | Catelli ...................... B31F 1/07 |
| | | | 101/6 |
| 2022/0168925 A1 | * | 6/2022 | Giurlani ................ B29C 33/026 |

FOREIGN PATENT DOCUMENTS

| | | | | |
|---|---|---|---|---|
| DE | 10 54 952 B | | 4/1959 | |
| EP | 2921275 A1 | * | 9/2015 | ............. B29C 43/24 |
| WO | WO-0140571 A2 | * | 6/2001 | ............... D21G 1/00 |
| WO | 2005/123374 A1 | | 12/2005 | |

\* cited by examiner

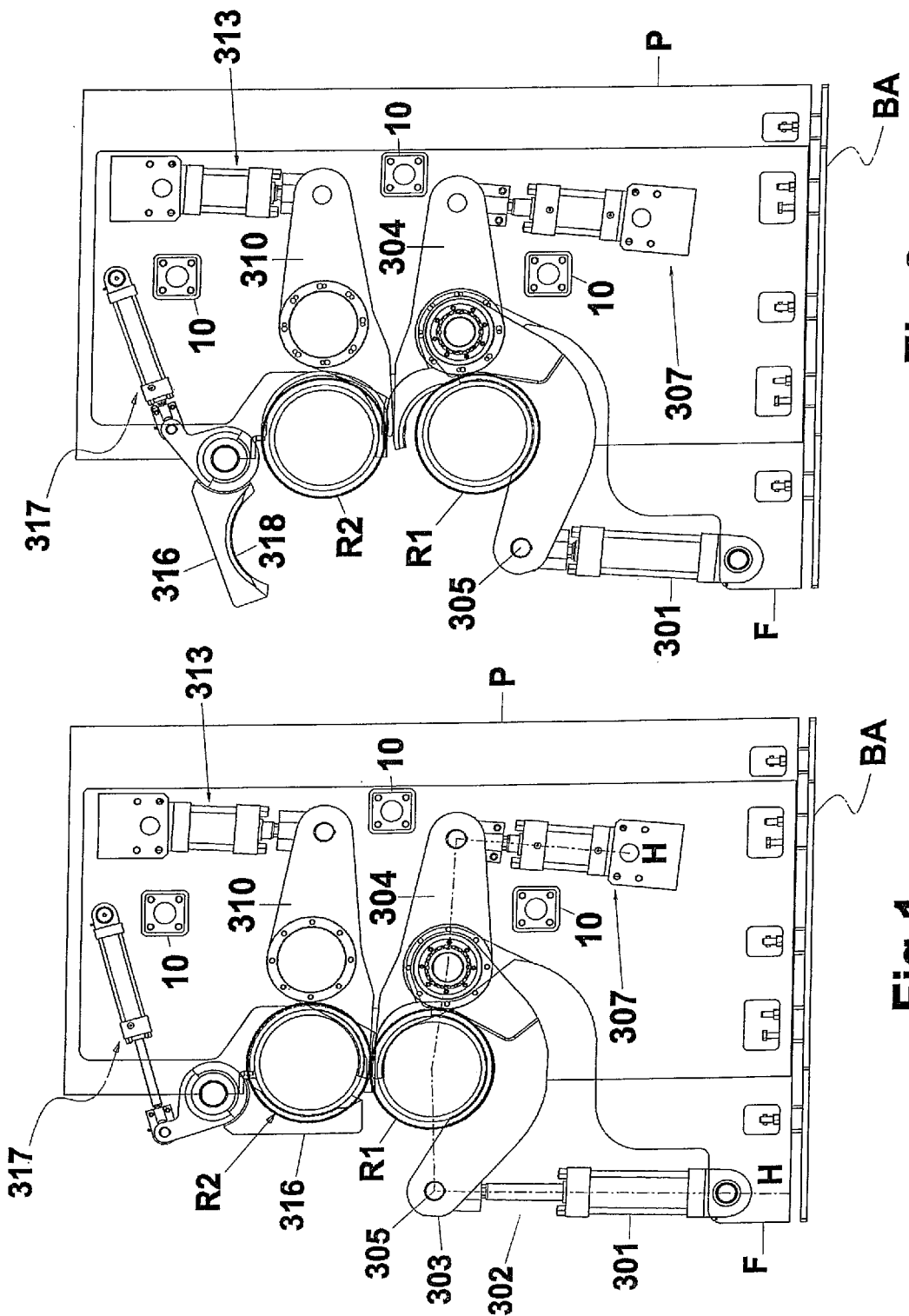

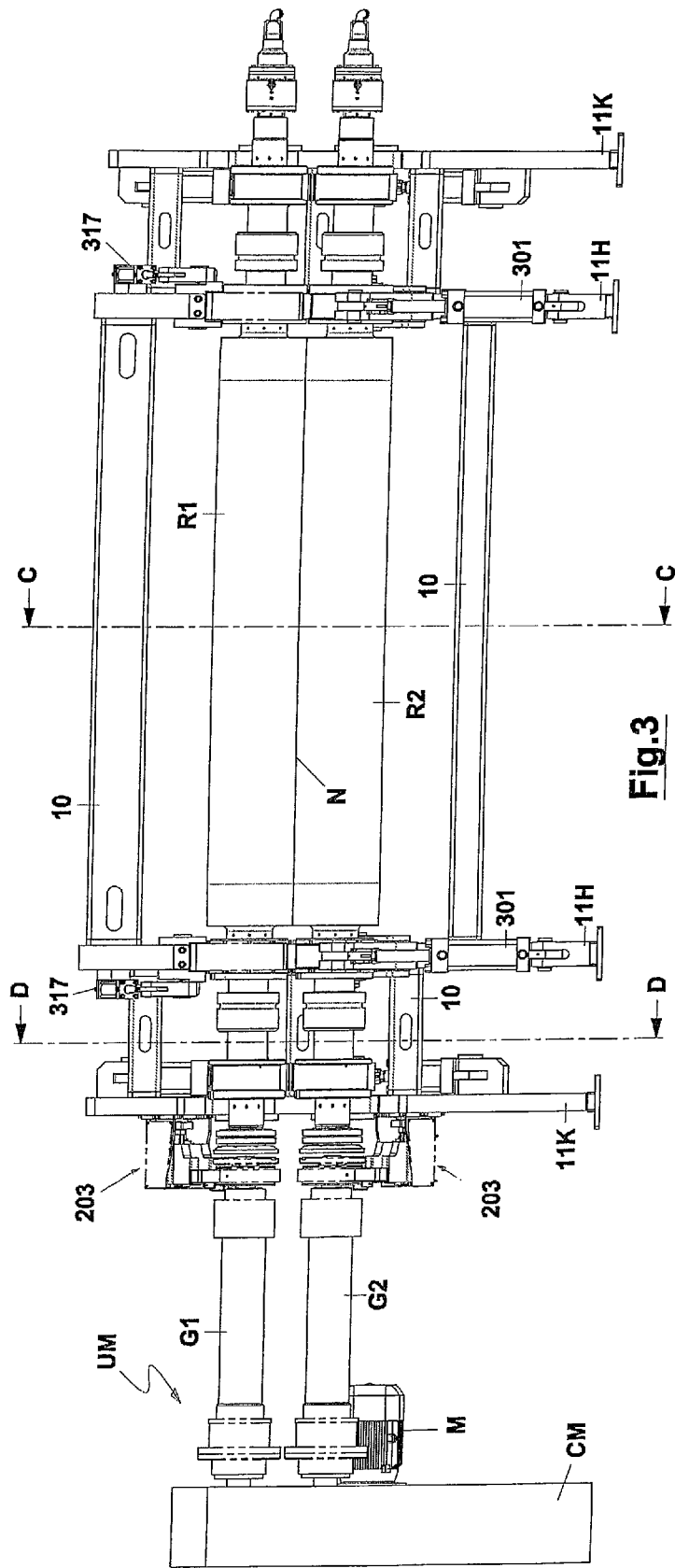

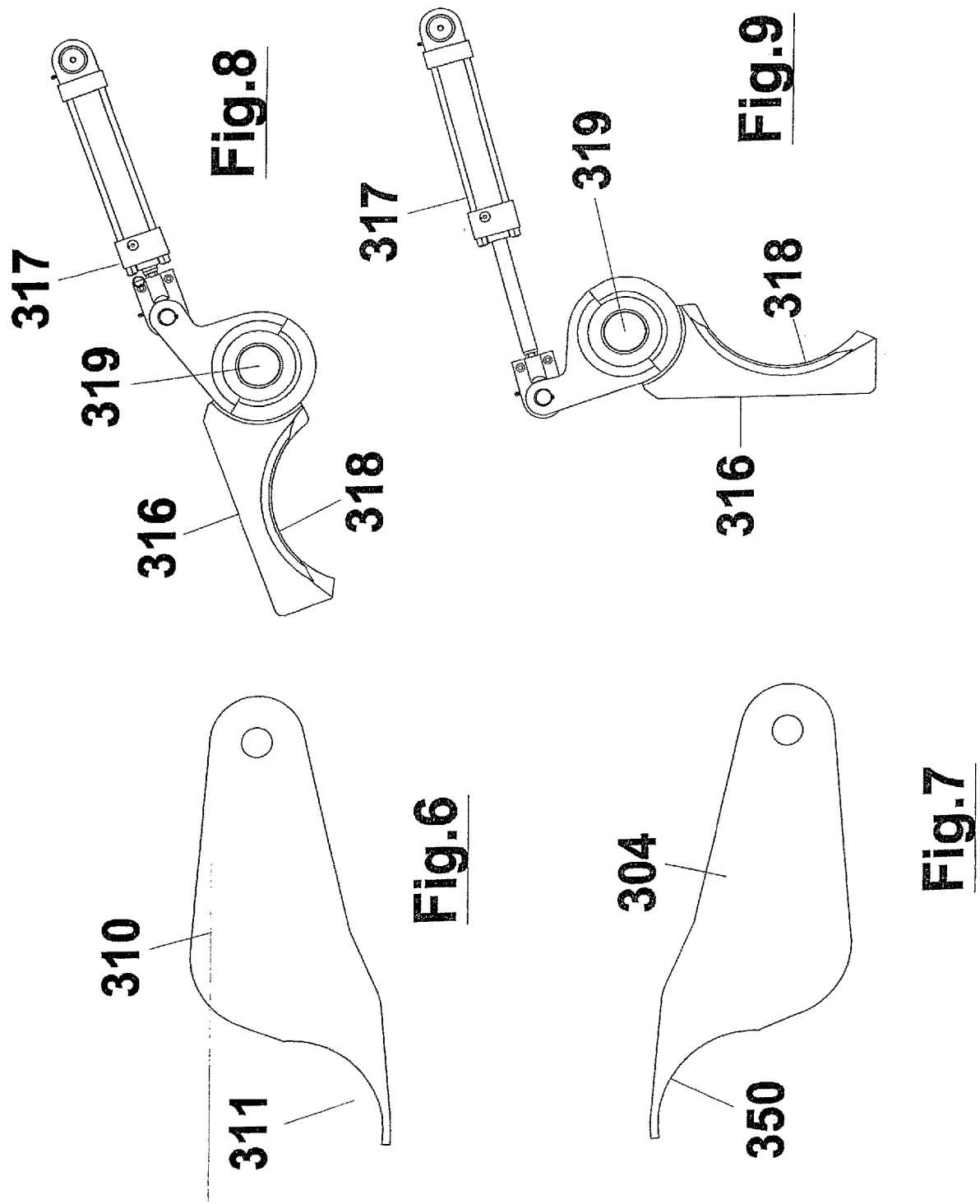

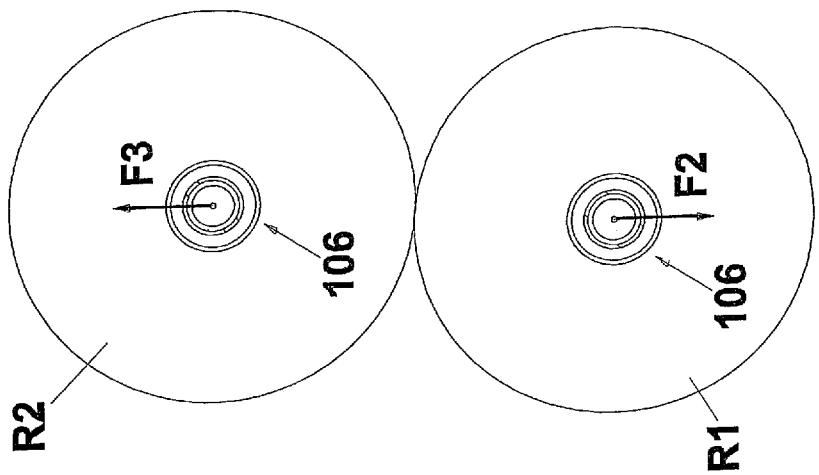
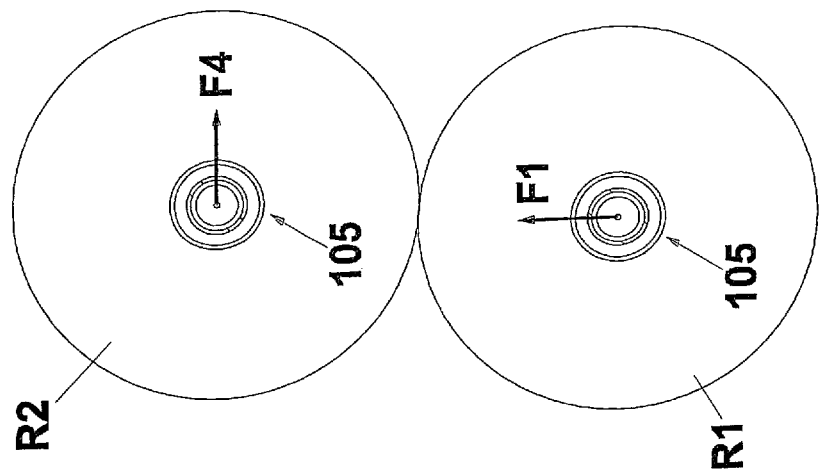

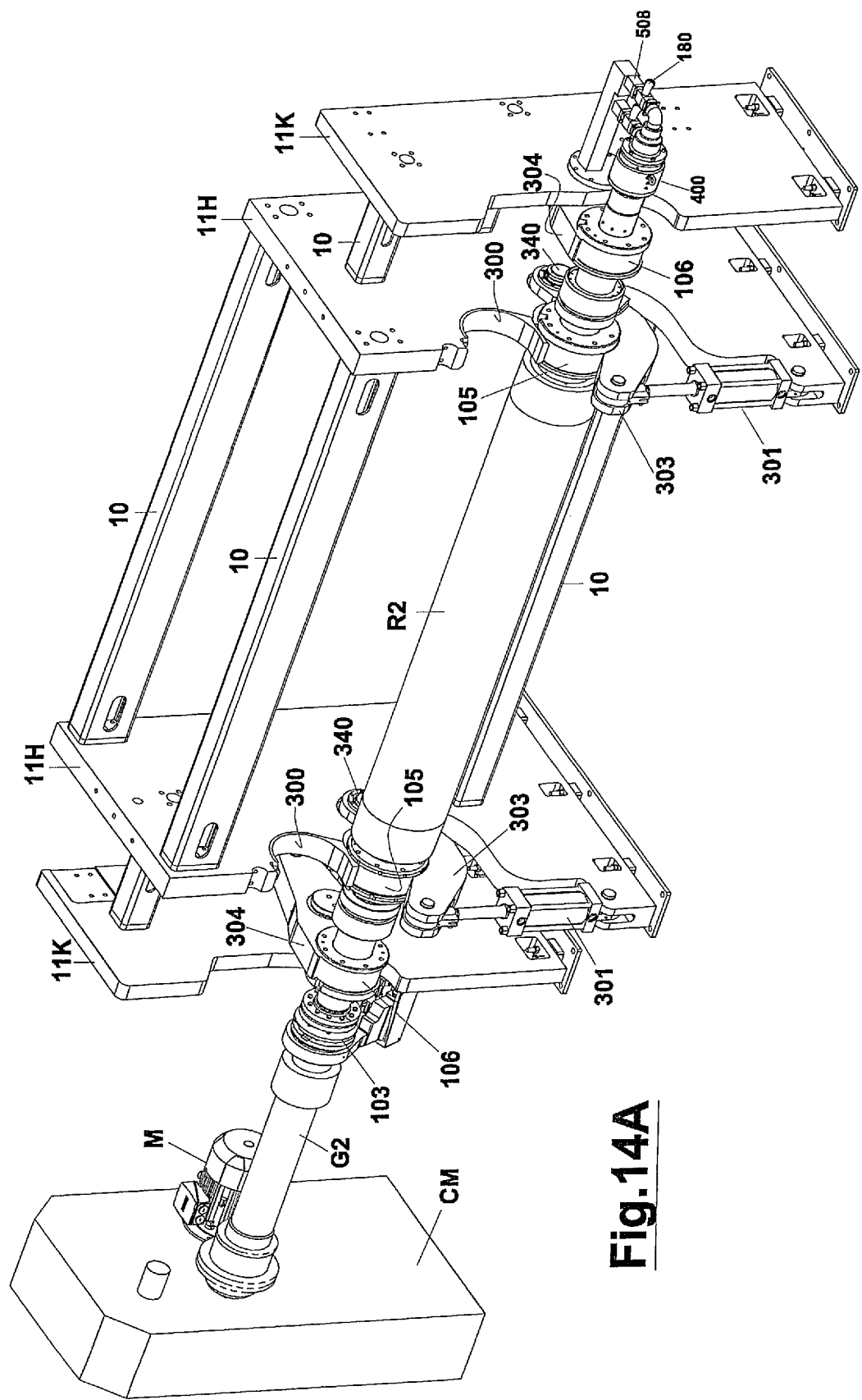

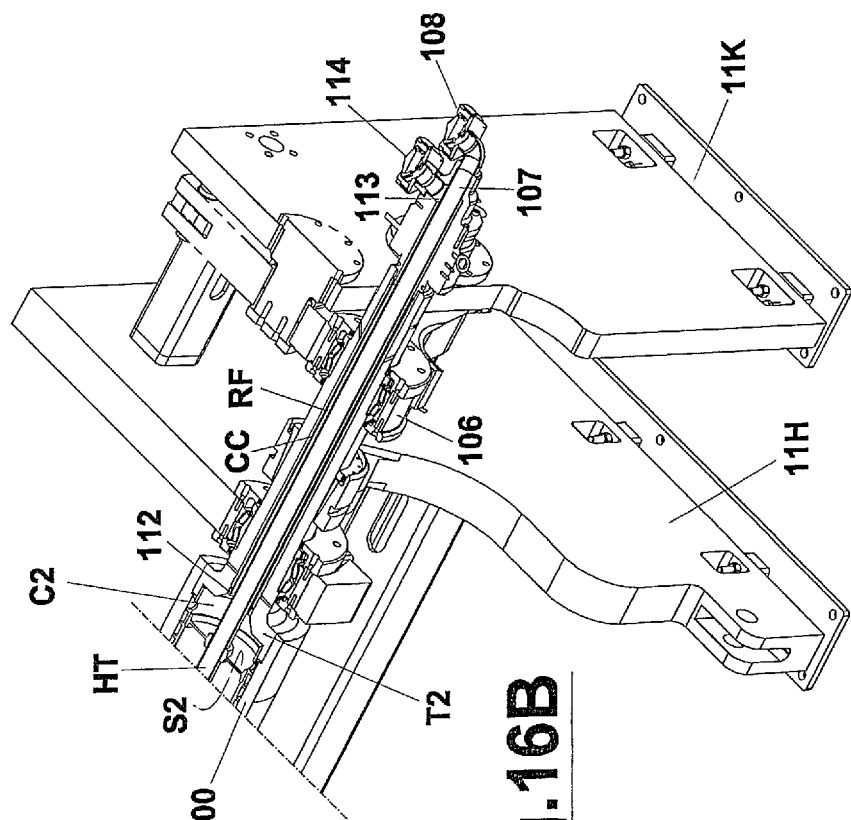
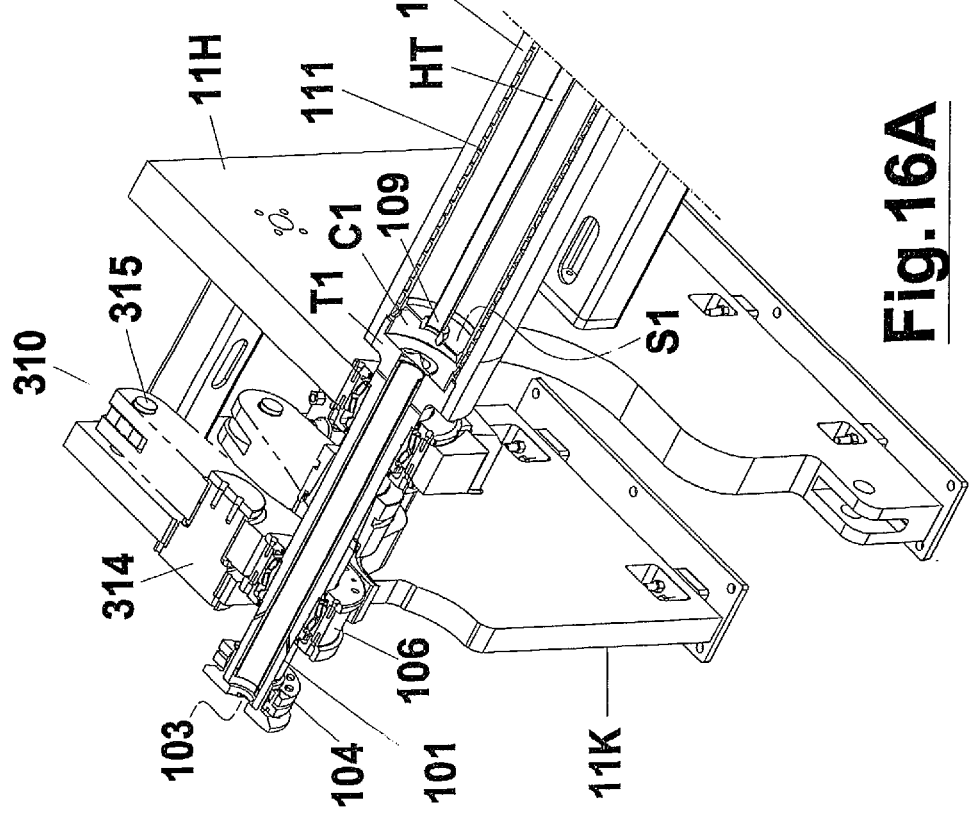

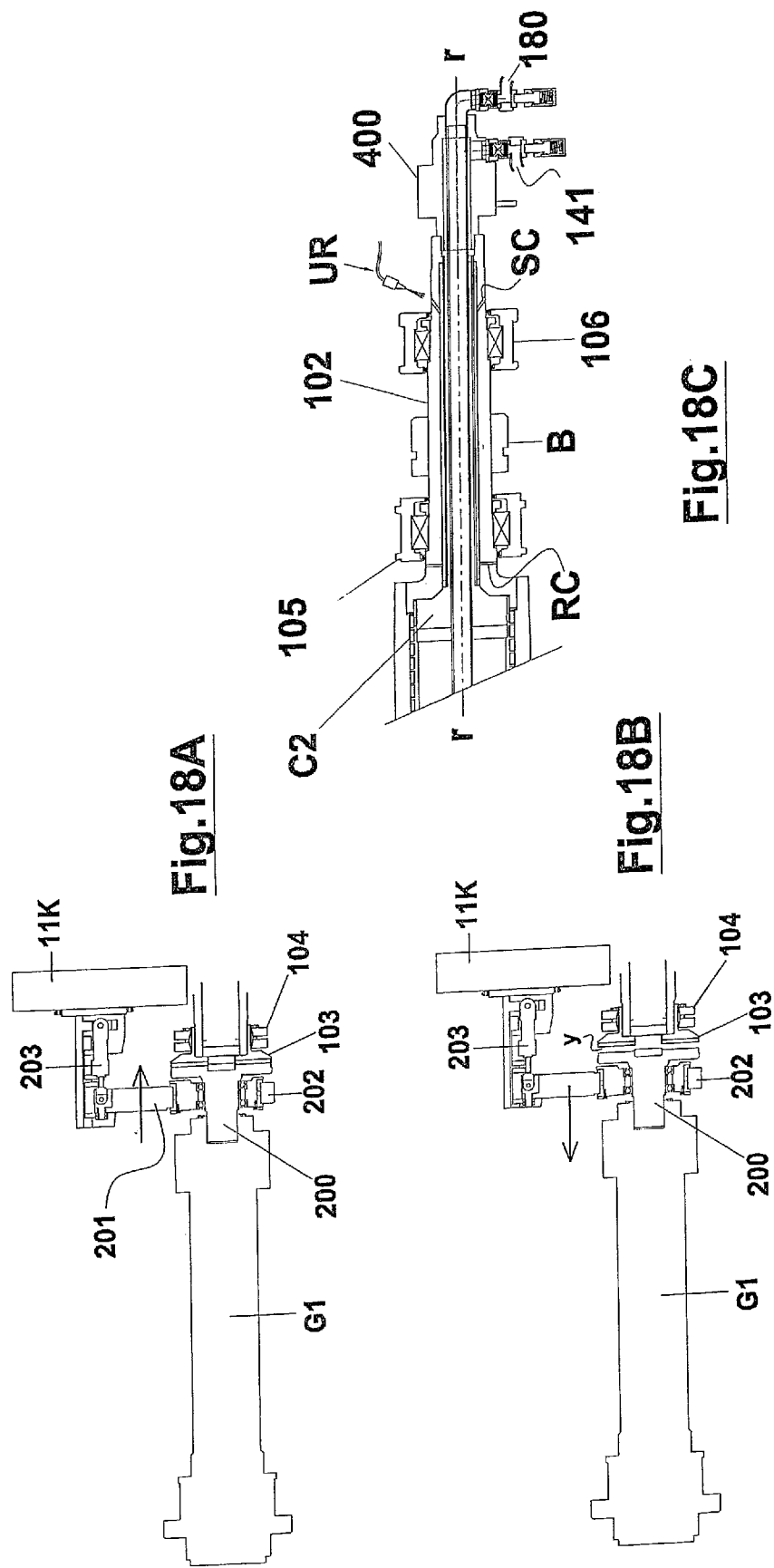

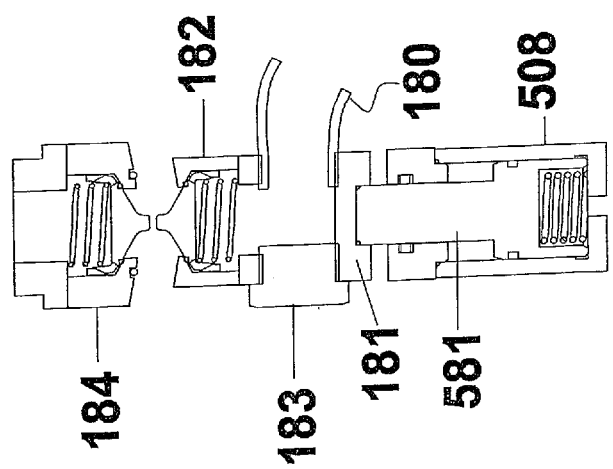
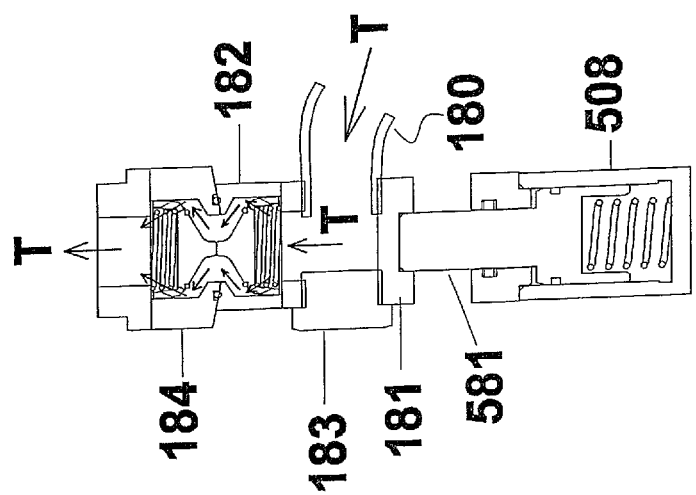
Fig.19A
Fig.19B

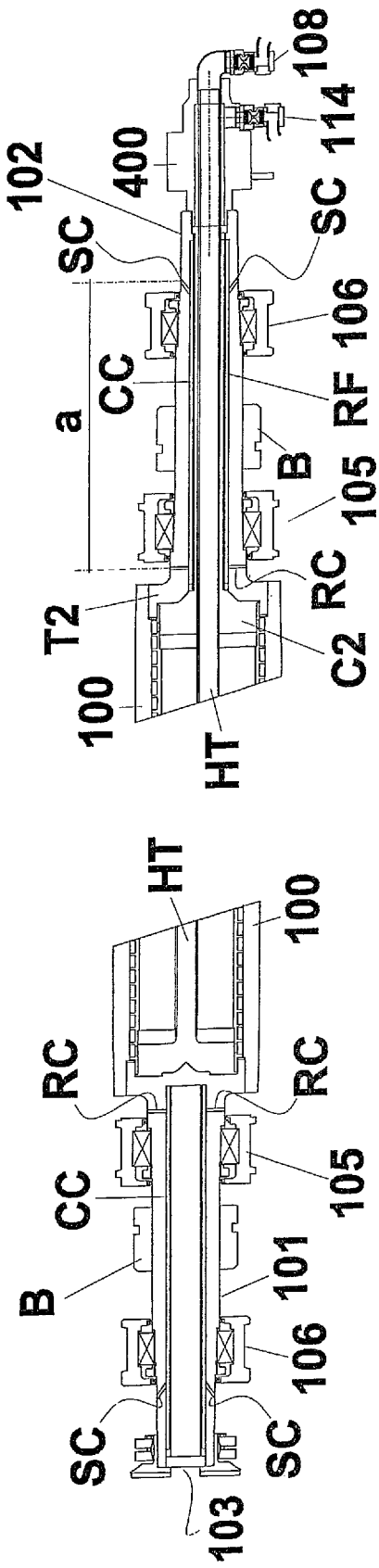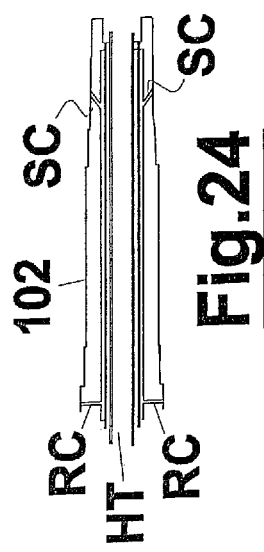

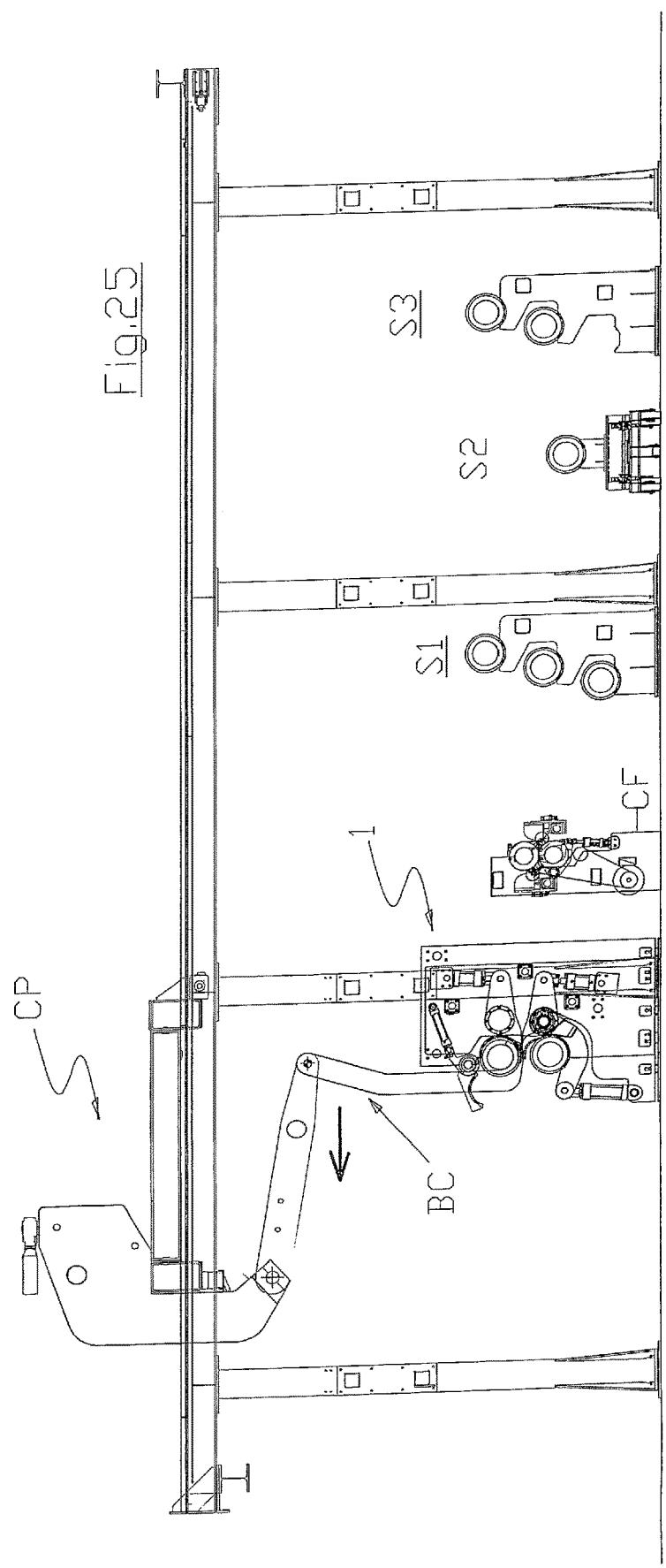

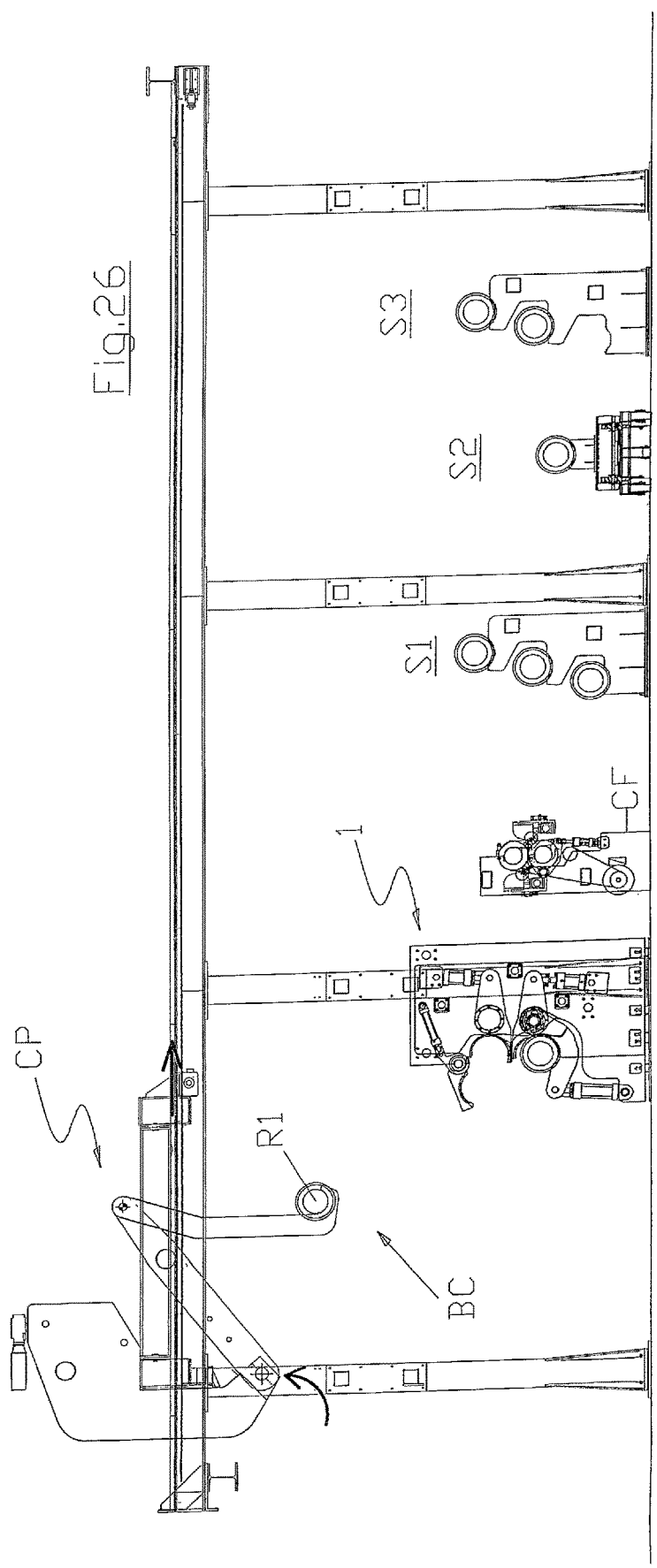

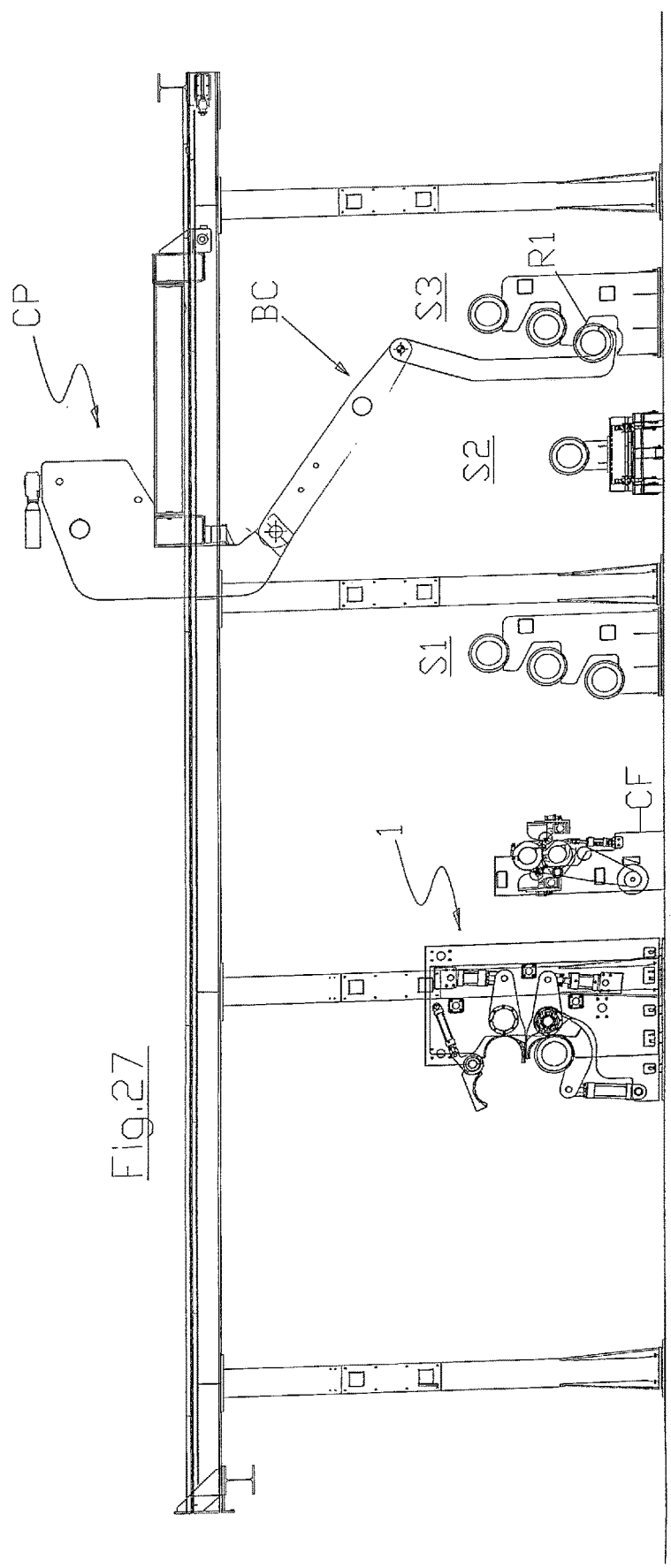

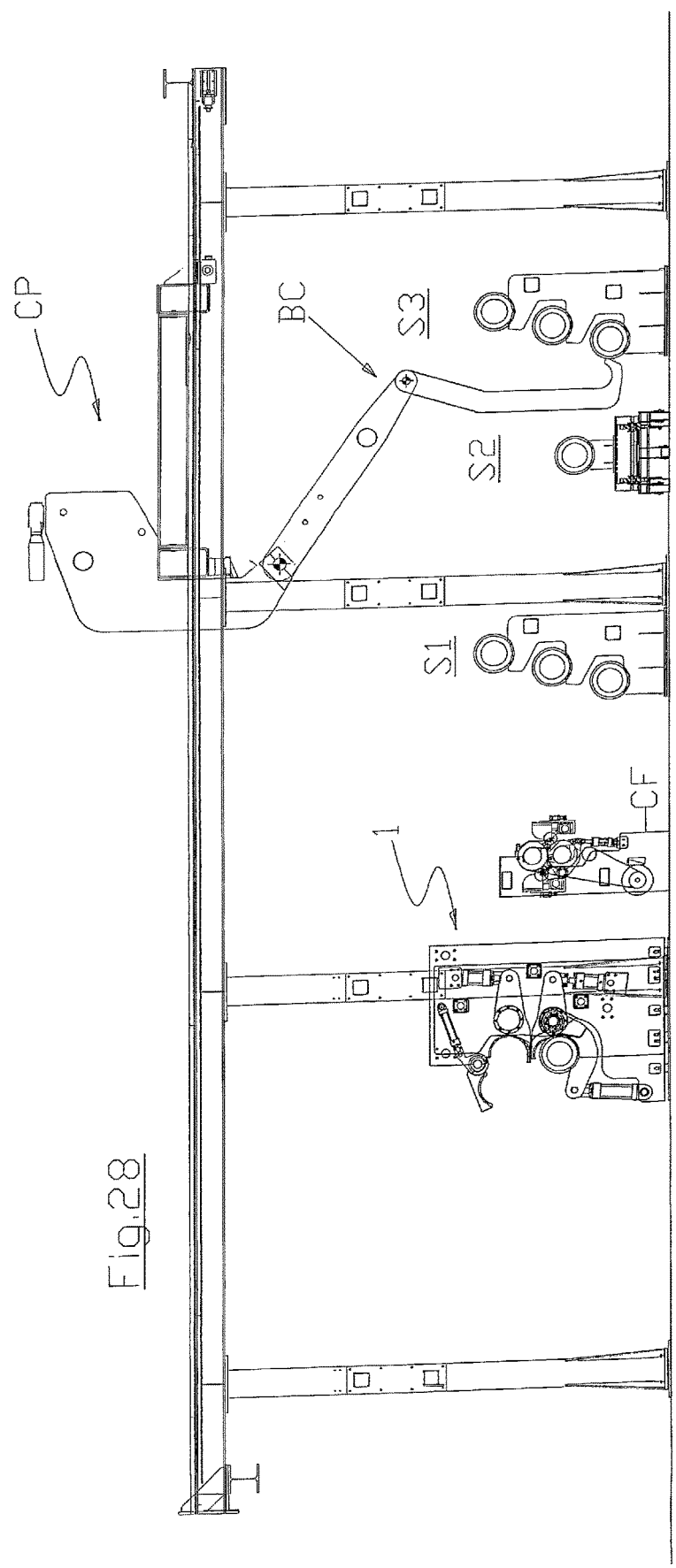

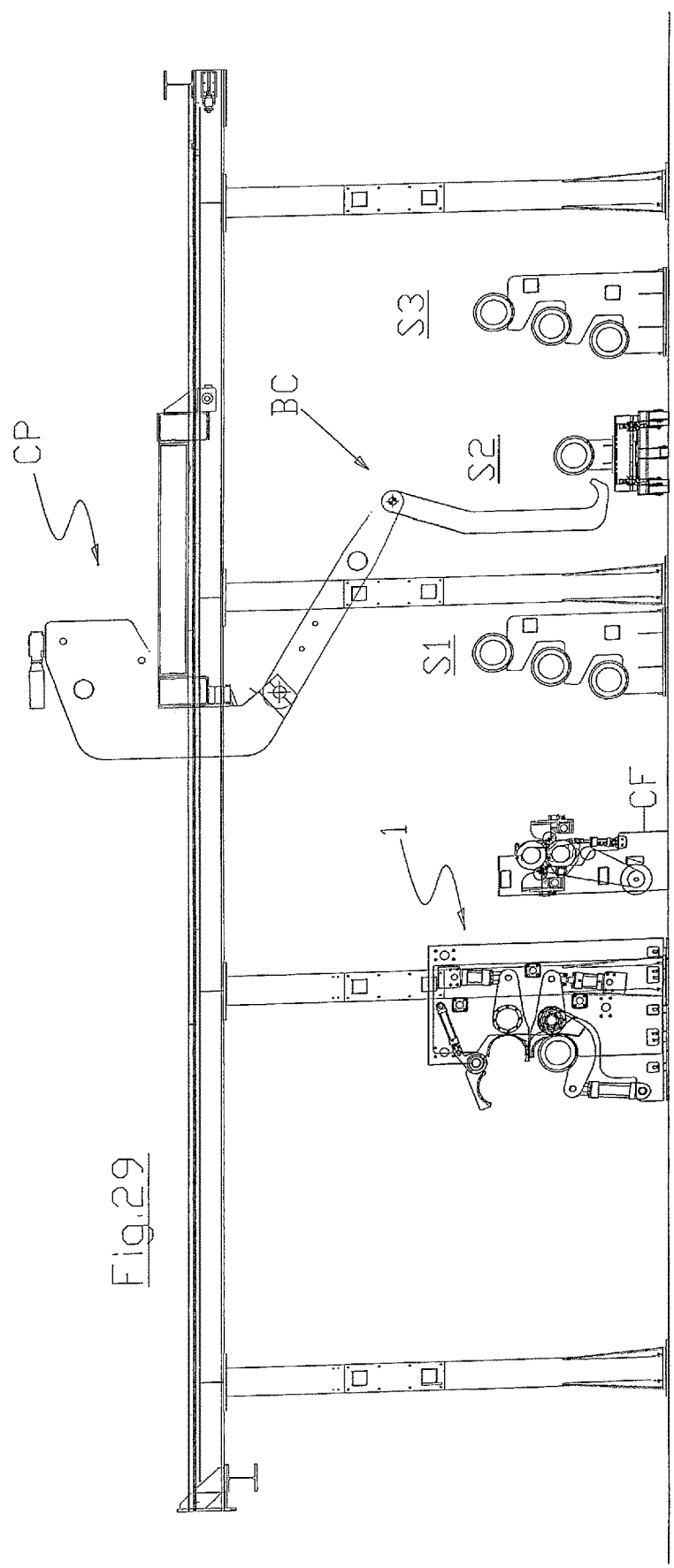

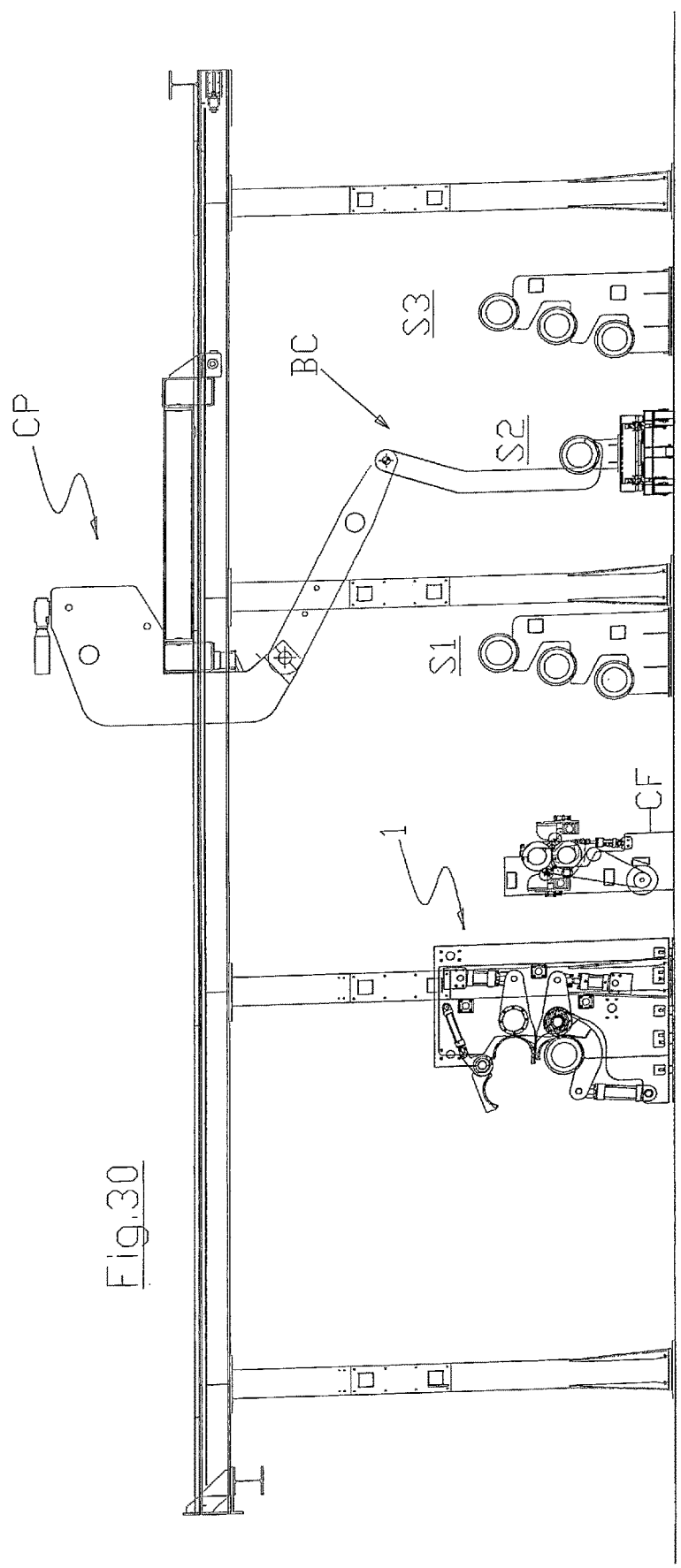

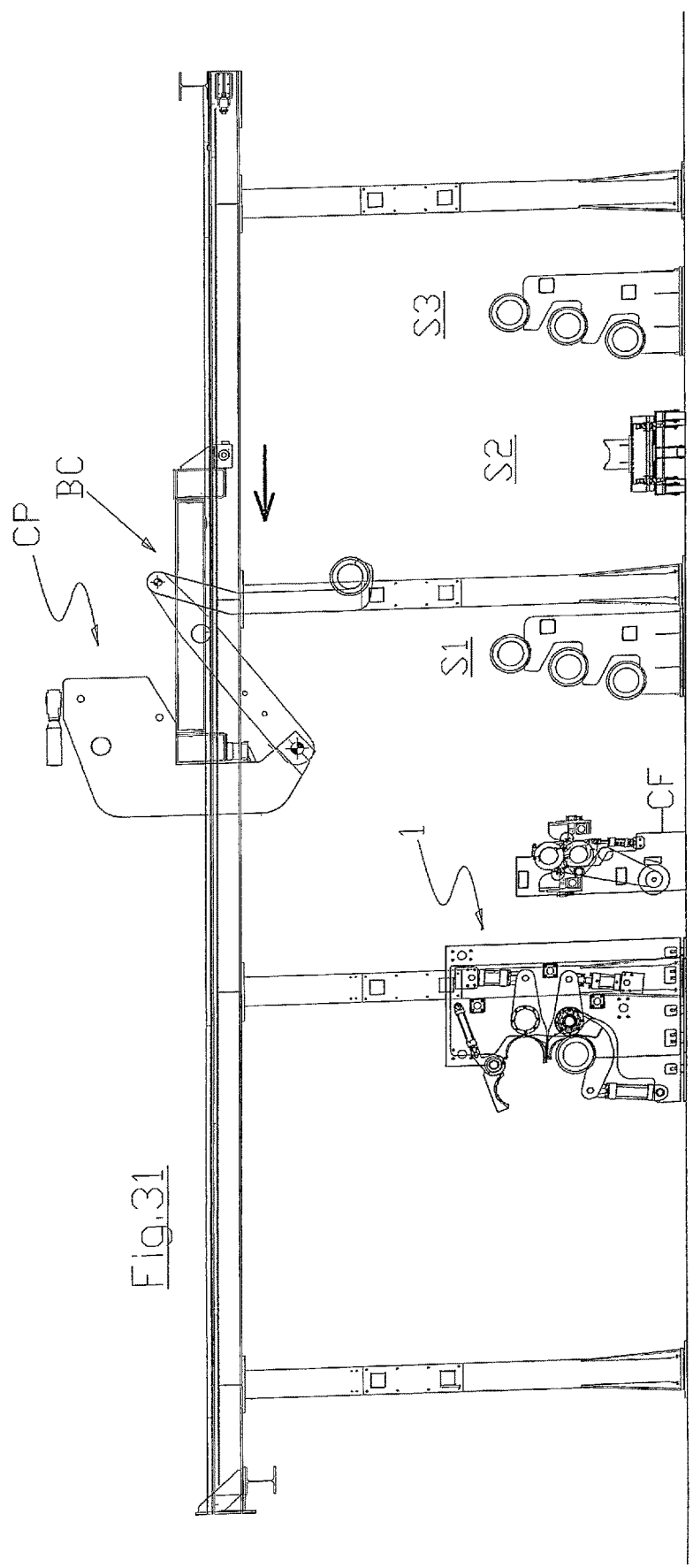

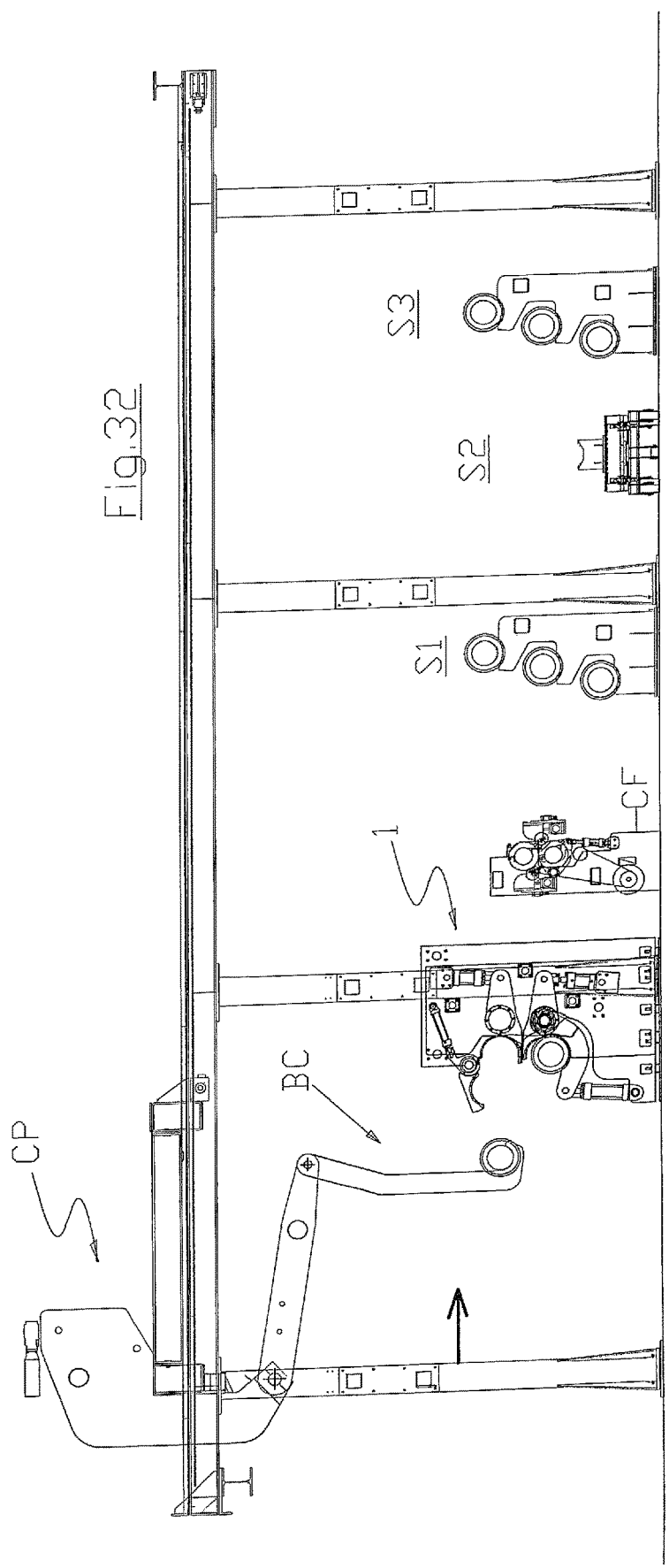

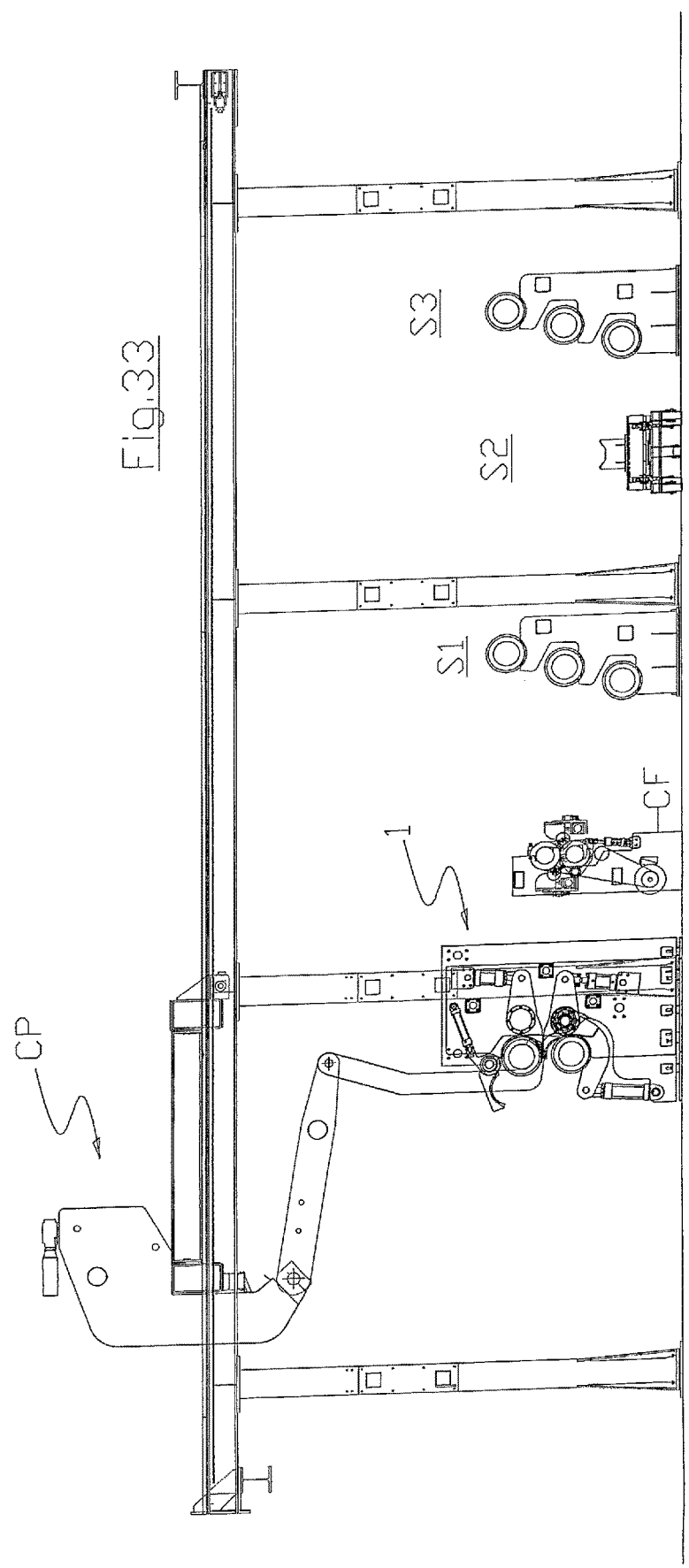

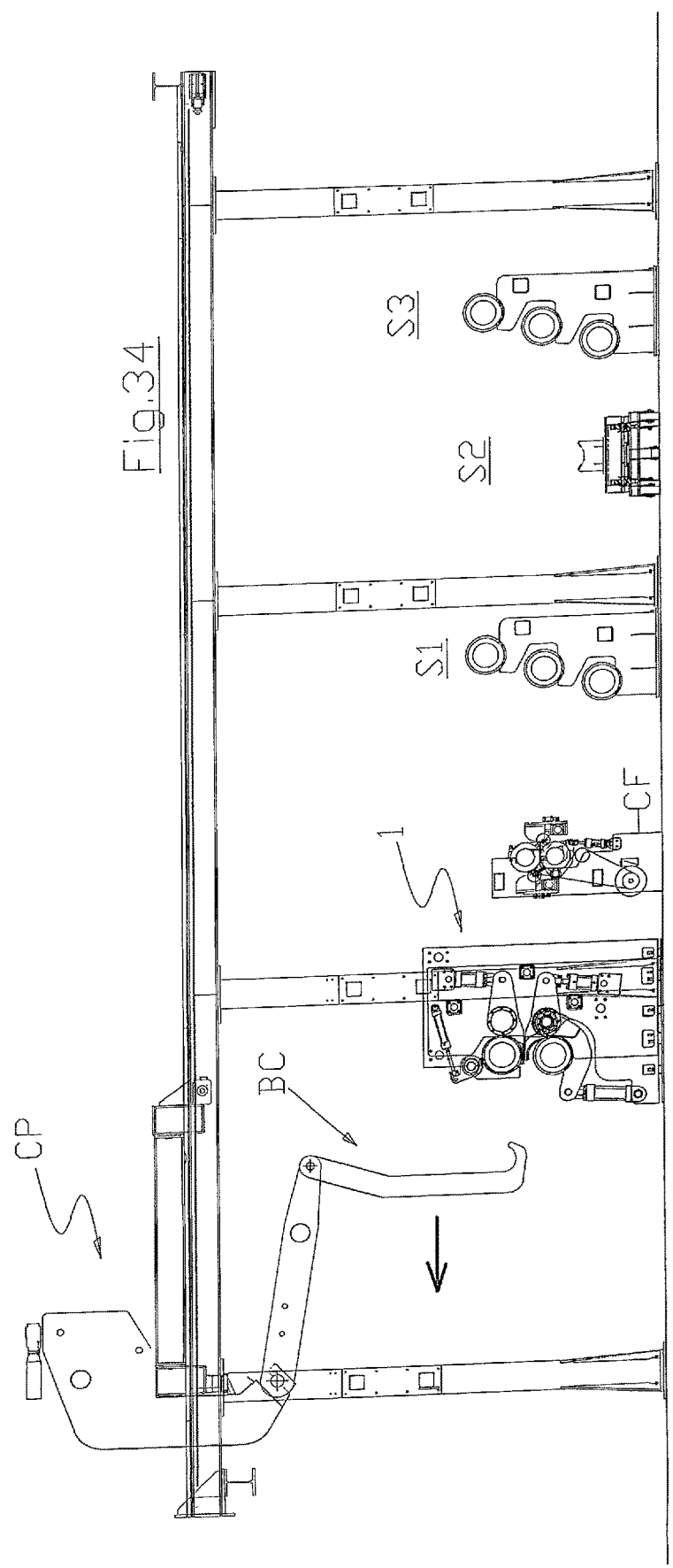

CALENDER FOR THE TREATMENT OF WEB-LIKE MATERIALS

FIELD

The present invention relates to a calender for the treatment of web-like materials.

In particular, a calender according to the present invention relates to the treatment of web-like materials by means of heated rollers.

BACKGROUND

The treatment of web-like materials, in particular non-woven fabric (TNT), is described in U.S. Pat. No. 3,507,943 that discloses a system comprising a calender formed by two heated embossing rollers defining a nip crossed by a TNT web containing thermoplastic fibers. The material crossing the nip between the two rollers is subjected to a combined action of pressure and heat that determines a change in the arrangement and the physical state of the fibers contained in the web. In particular, depending on the pressure exerted by the rollers on the material subjected to the treatment, on the operating temperature of the rollers, on the thickness and composition of the material, as well as on the surface finishing of the rollers, deformations corresponding to pre-determined patterns can be formed on the material. Another system comprising a calender making use of heated rollers for the treatment of TNT is described in U.S. Pat. No. 4,005,169.

WO2005/123374A1 discloses a support apparatus for embossing rollers comprising a fixed structure with two sides, which provide multiple supports for one or more embossing rollers having the respective horizontal axes between said sides and connected with corresponding motors that drive the rollers such that the rollers rotate around their respective axes at a preset angular speed.

DE1054952B discloses a calender for textiles, paper, plastic or the like comprising removable pattern rollers. A drawback to the use of heated rollers for the treatment of TNT in conventional production systems lies in the fact that it is necessary to wait many hours to allow the rollers to cool down in order to safely attach them to bridge crane systems used for replacing the rollers.

Another drawback of conventional production systems is linked to the need to provide adequate cooling systems for the bearings applied on the calender rollers which entail structural and operational complexities that reduce their cost effectiveness.

Further drawbacks of conventional production systems are associated with the need to perform many manual operations in order to disengage the rollers from the calender, which entails excessive roller replacement times compared to current production needs and greater risks for the safety of the operators who perform such operations.

SUMMARY

The main object of the present invention is to provide a system capable of eliminating, or at least drastically reducing, the aforementioned drawbacks.

This result has been achieved, in accordance with the present invention, by providing a calender having the features indicated in claim 1. Other features of the present invention are the subject of the dependent claims. Thanks to the present invention, it is possible to reduce the rollers replacement time and, at the same time, increase the safety of this operation. Furthermore, it is possible to simplify the structure of the calender in order to further reduce the rollers replacement time.

BRIEF DESCRIPTION OF THE FIGURES

These and further advantages and characteristics of the present invention will be more and better evident to each person skilled in the art thanks to the following description and the annexed drawings, provided by way of example but not to be considered in a limiting sense, wherein:

FIG. 1 is a schematic side view in transparency of a calender in accordance with the present invention in operating position;

FIG. 2 is a schematic side view in transparency of a calender in accordance with the present invention in the allowed extraction position of the rollers (R1, R2);

FIG. 3 is a schematic front view of a calender in accordance with the present invention;

FIG. 6 represents the levers in an operating position;

FIG. 7 represents the levers in an operating position;

FIG. 8 schematically represents the lever in a position of allowed extraction of a roller;

FIG. 9 schematically represents the lever in an operating position;

FIG. 10 is a diagram representing forces acting on the rollers of the calender shown in the previous figures;

FIG. 11 is a diagram representing forces acting on the rollers of the calender shown in the previous figures;

FIG. 14A represents the calender of FIG. 11 in which some parts are omitted to better show other parts;

FIG. 16A is an enlarged detail of FIG. 15;

FIG. 16B is an enlarged detail of FIG. 15;

FIG. 18A is a detail showing a joint in engagement position on the pin of a roller;

FIGS. 18A and 18B are two details showing a joint in in disengagement position;

FIG. 18C is a detail relating to a possible implementation of the bearing cooling system;

FIG. 19A is a diagram showing the opening and closing of a valve for the introduction of the heating fluid into a calender roller shown in the previous figures;

FIG. 19B is a diagram showing the opening and closing of a valve for the introduction of the heating fluid into a calender roller shown in the previous figures;

FIG. 22 is a further enlarged detail of FIG. 15;

FIG. 23 is a further enlarged detail of FIG. 15;

FIG. 24 is a detail of FIG. 23;

FIG. 25 schematically represents the handling of a roller of a calender in accordance with the present invention;

FIG. 26 schematically represents the handling of a roller of a calender in accordance with the present invention;

FIG. 27 schematically represents the handling of a roller of a calender in accordance with the present invention;

FIG. 28 schematically represents the handling of a roller of a calender in accordance with the present invention;

FIG. 29 schematically represents the handling of a roller of a calender in accordance with the present invention;

FIG. 30 schematically represents the handling of a roller of a calender in accordance with the present invention;

FIG. 31 schematically represents the handling of a roller of a calender in accordance with the present invention;

FIG. 32 schematically represents the handling of a roller of a calender in accordance with the present invention;

FIG. 33 schematically represents the handling of a roller of a calender in accordance with the present invention;

FIG. 34 schematically represents the handling of a roller of a calender in accordance with the present invention;

DETAILED DESCRIPTION OF THE EMBODIMENTS

Figure 5:
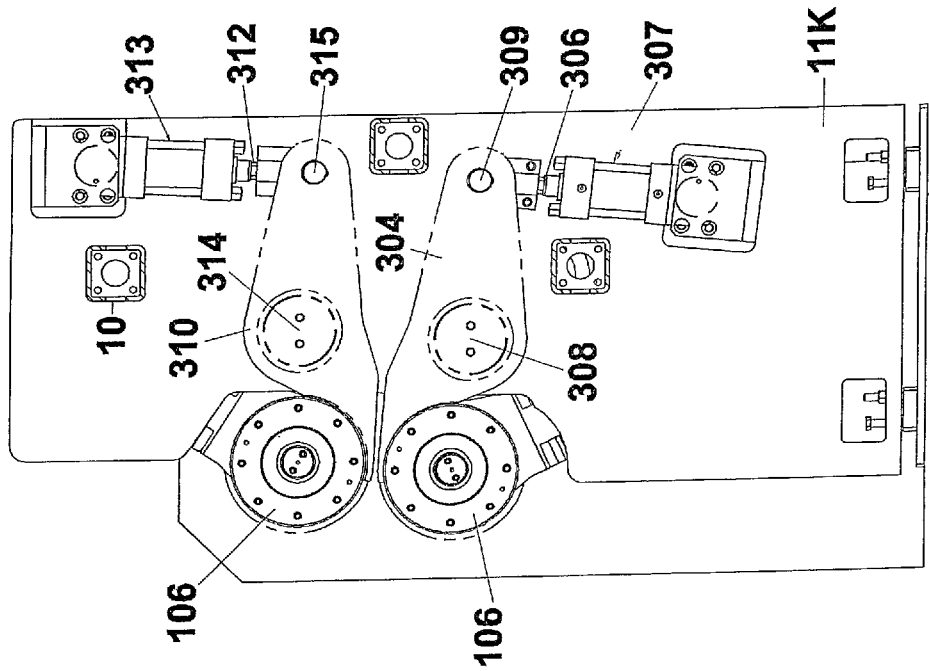
FIG. 5 is a section view along the line D-D of FIG. 3.
Figure 4:
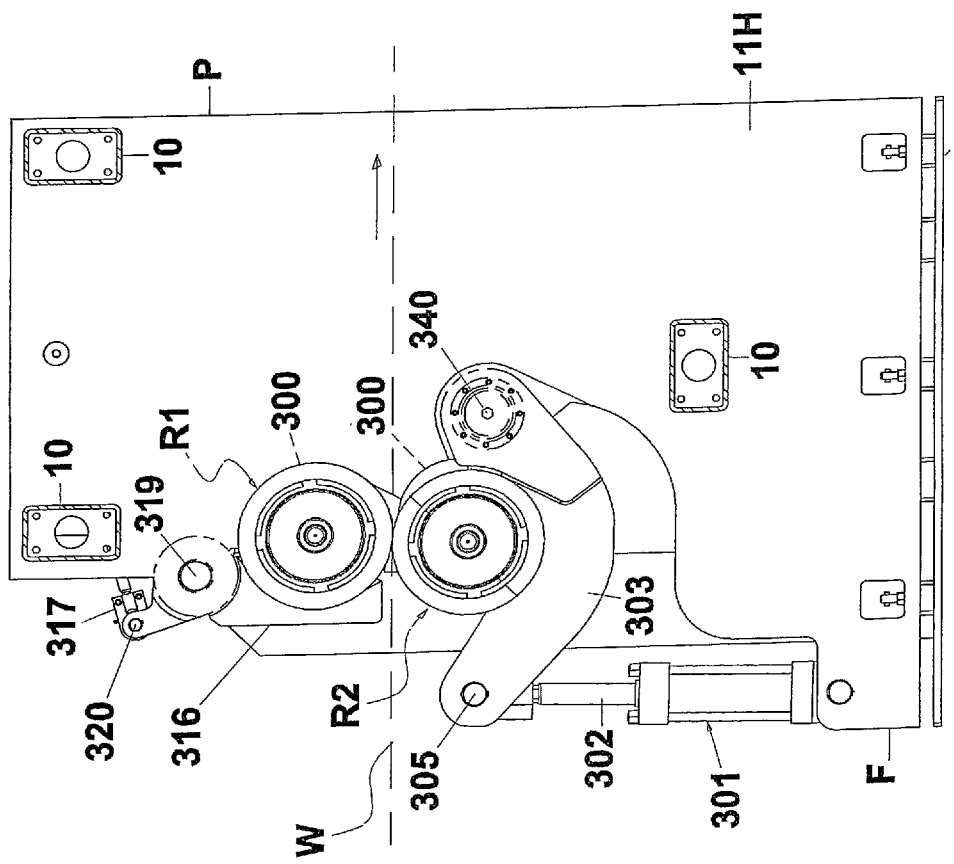
FIG. 4 is a section view along the line C-C of FIG. 3.
Figure 12:
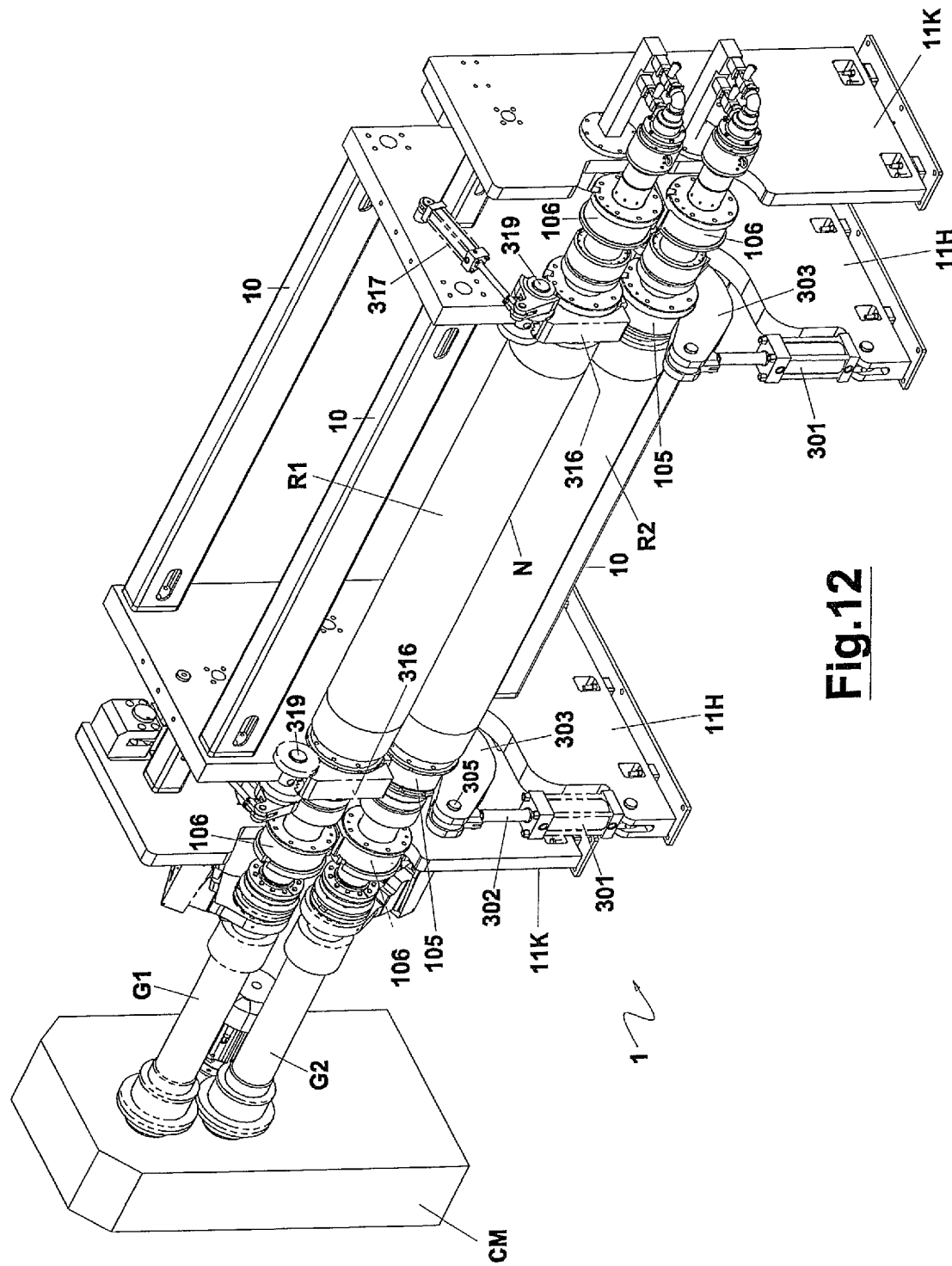
FIG. 12 is a perspective view of a calender in accordance with the present invention.
Figure 13:
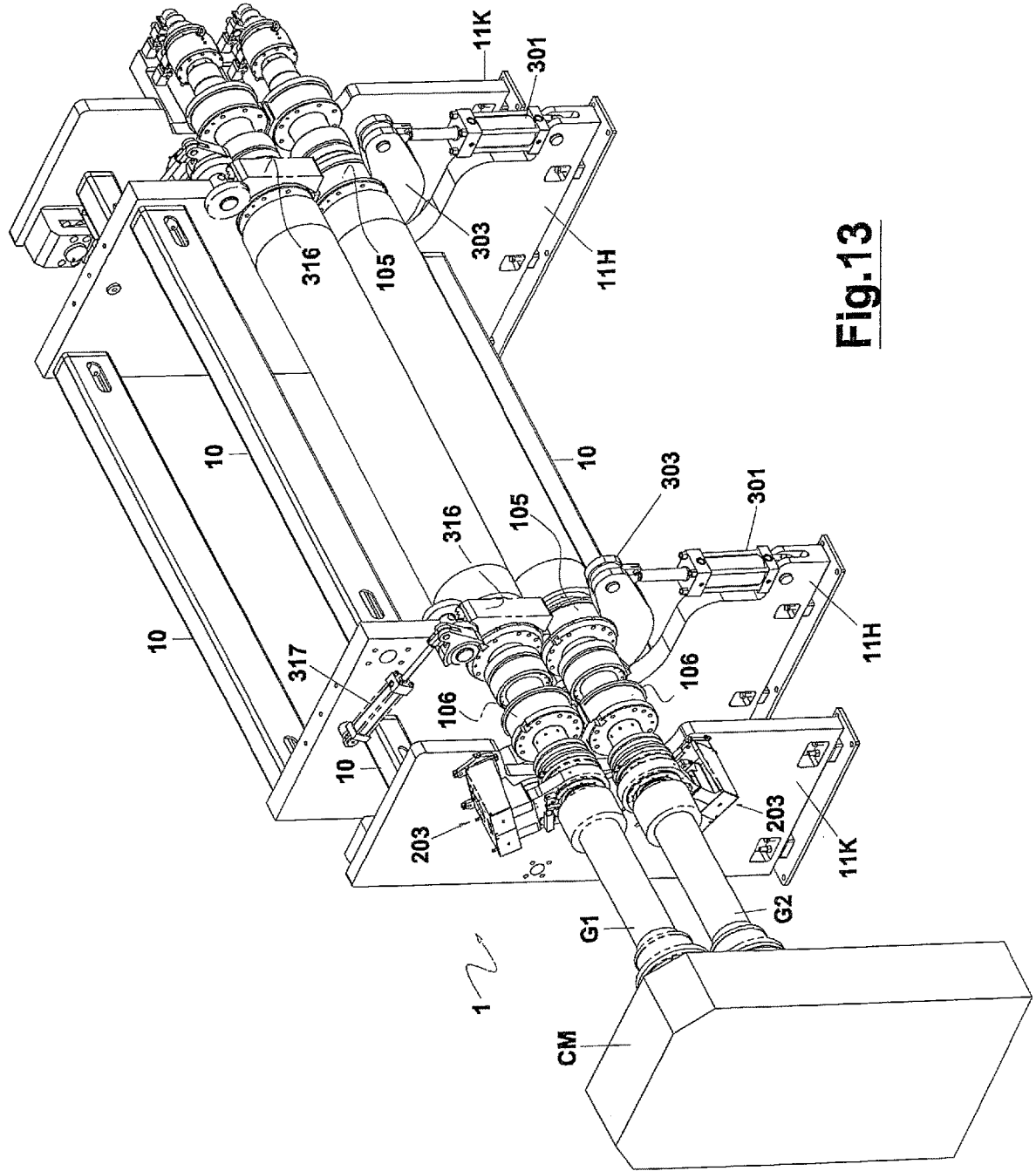
FIG. 13 is a perspective view of a calender in accordance with the present invention.

Reduced to its essential structure and with reference to the figures of the attached drawings, a calender (1) in accordance with the present invention comprises a structure formed by a load-bearing frame with metal crosspieces (10) and side walls (11H, 11K) delimiting a space in which there are two rollers (R1, R2) that are oriented with their respective longitudinal axes orthogonally to the same walls (11H, 11K) and are positioned so as to define a nip (N) that can be crossed by the material (W) to be treated. The rollers (R1, R2) are heatable rollers and are removably supported by said structure (10, 11H, 11K) such that they can be removed and replaced with other heatable rollers when needed. The rollers (R1, R2) are intended to rotate with predetermined angular speed, in opposite directions, around the respective longitudinal axes. For this purpose, a drive unit (UM) is provided, to which the rollers (R1, R2) can be connected to control their rotation as said above. For simplification, the material (W) is represented only in FIG. 4, by means of a horizontal dotted line above which an arrow is placed which indicates the direction followed by the material itself.

The web-like material (W) is of the type normally used to make non-woven fabric items. For example, said material can be constituted exclusively by thermoplastic fibers or also by a mix of thermoplastic fibers and non-thermoplastic fibers such as cellulose, i.e. a material intended to be treated by passing through a calender with heated rollers.

Each roller (R1, R2) comprises an external jacket (100) that can be smooth or provided with reliefs and/or depressions arranged according to a predefined pattern. Therefore, on the calender (1) can be mounted two rollers (R1, R2) both with a smooth jacket, two rollers (R1, R2) both with a jacket (100) provided with reliefs and/or depressions, or two rollers (R1, R2) forming a calender in which the jacket (100) of one roller is smooth and the jacket (100) of the other roller is provided with reliefs and/or depressions. Furthermore, each roller (R1, R2) has a pin at each of the end heads (T1, T2), with a first pin (101) connectable to the drive unit (UM) and a second pin (102) through which it can be inserted a fluid for heating the roller. Said pins (101, 102) are aligned along the longitudinal axis of the roller which coincides with the rotation axis (r-r) of the latter when it is positioned in operating position on the aforementioned structure.

For example, the rollers (R1, R2) are both engraved rollers and arranged in the so-called "tip-to-tip" configuration.

For example, the drive unit (UM) comprises an electric motor (M) connected with two axial elastic joints (G1, G2) by means of a belt or chain transmission (not visible in the drawings) contained in a carter (CM) positioned externally to the structure (10, 11H, 11K). Each joint (G1, G2) is arranged in correspondence with the rotation axis (r-r) of a respective roller (R1, R2) and is provided with an end (200) sliding axially with respect to the joint itself. On the end (200) an arm (201) is connected with the interposition of a bearing (202). On the opposite side, the arm (201) is connected to a hydraulic actuator (203) that, in turn, is fixed to a side wall (11K) of said structure.

Said end (200) is shaped to be coupled with a power take-off (103) arranged on the end of the first pin (101) of the respective roller (R1, R2). In accordance with the example shown in the drawings, the power take-off (103) is keyed onto the first pin (101) by means of fit rings (104). Since the joints are two in number, i.e. in number equal to the number of rollers (R1, R2), two actuators (203) are provided, each acting on a respective arm (201), and each arm (201) is connected to the end (200) of the corresponding joint (G1, G2). In FIG. 18A the joint (G1) is in engagement position on the first pin (101) while in FIG. 18B it is in disengagement position. The positioning of the joint in the engagement/disengagement position on the first pin (101) is controlled by the actuator (203). As shown in FIG. 18B, in the disengagement position of the joint, sufficient space (y) is formed between the end (200) and the power take-off (103) to allow removal of the roller as further described below.

In accordance with the example shown in the drawings, the aforementioned structure comprises a pair of side walls (11H, 11K) for each side, i.e. a pair of side walls (11H, 11K) on the side of the drive unit (UM) and a pair of side walls (11H, 11K) on the opposite side, so as to provide two external walls (11K) and two internal walls (11H). The distance between the internal walls (11H) is less than the distance between the external walls (11K). The internal side walls (11H) have, on their respective front sides (F), two overlapping recesses (300) suitable for partially housing corresponding bearings (105) associated with the rollers (R1, R2) in proximity of the respective side heads (T1, T2). Furthermore, an actuator (301) is mounted on the front side (F) of each internal side wall (11H), for example a hydraulic actuator, whose stem (302) is constrained to a front end of a lever (303). The latter has a concave part, with the concavity facing upwards, and is hinged to the respective internal side wall (11H) by means of a pin (340) with a horizontal axis arranged on the back of the lower recess (300), i.e. on the back of the recess (300) closest to the base (BA) of the structure. In practice, said pin (340) is on the opposite side with respect to the point (305) connecting the stem (302) to the front end of the lever (303). The concave part of the lever (303), which is intermediate between said connection point (305) and the pin (340), cooperates with the respective lower recess (300) to delimit the lower housing of a corresponding bearing (105) of the lower roller (R2). The actuators (301) are synchronized, so that the two levers (303) rotate in synchronism around the respective pins (340).

On each external side wall (11K), and more precisely on the side facing the respective internal side wall (11H), a lever (304) is applied which has a preferably concave front side (350) with the concavity facing downwards, is constrained to the stem (306) of a corresponding hydraulic actuator (307), and is hinged to the wall (11K) by means of a pin with a horizontal axis (308) in an intermediate position between its concave front side (350) and the point (309) of connection to the actuator stem (307). The front side of each lever (304) is intended to engage from above a bearing (106) of each roller (R1, R2) at a predetermined distance from the previously mentioned bearing (105). Above the lever (304) there is another lever (310) which is identical to the first (304) but is in a specular position, i.e. with the concavity of the respective front end (311) turned upwards instead of downwards. Said further lever (310) is also constrained to the stem (312) of a respective hydraulic actuator (313) and is hinged to the wall (11K) by means of a respective pin (314) with a horizontal axis in an intermediate position between its side front (311) and the point (315) of connection to the actuator stem (313). The front side of the further lever (310) is intended to engage a corresponding bearing (106) from below.

On the front side (F) of each internal side wall (11H) an additional lever (316) is mounted which on its rear side is connected to a corresponding hydraulic actuator (317), on its front side has a concave part (318) which in operating position of the calender is turned towards the rear side (P) of the wall (11H), and is hinged to the wall (11H) by means of a respective pin (319) with a horizontal axis in an intermediate position between its front side (318) and the point (320) of connection to the stem of the actuator (317).

In practice, on each external side wall (11K) are applied:
a lower lever (304) controlled by an actuator (307) that controls the rotation thereof around a pin (308) with a horizontal axis through which the same lever is connected to the wall (11K), a free front end (350) of said lower lever (304) being preferably concave with the concavity facing downwards; and
an upper lever (310) controlled by an actuator (313) that controls the rotation thereof around a pin (314) with a horizontal axis through which the same lever is connected to the wall (11K), a free front end (311) of said upper lever (310) being preferably concave with the concavity facing upwards.

Similarly, on each internal side wall (11H) are applied:
a lower lever (303) controlled by an actuator (301) which controls the rotation thereof around a pin (340) with a horizontal axis through which the same lever is connected to the wall (11H), an intermediate part of said lower lever (303) being preferably concave with the concavity facing upwards; and
an upper lever (316) controlled by an actuator (317) which controls the rotation thereof around a pin (319) with a horizontal axis through which the same lever is connected to the wall (11H), a front part (318) of said upper lever (316) being preferably concave with the concavity facing the rear part (P) of the same wall (11H) when the calender is in operating position.

Therefore, a calender according to the present invention is provided, on each of its right and left sides, with two lower levers (303, 304) and two upper levers (316, 310) placed at a predetermined distance (d) from each other and adapted for coming into contact with corresponding bearings (105, 106) arranged on the rollers (R1, R2) to exert on the same bearings (105, 106) forces (F1, F2, F3, F4) that oriented along not coinciding directions. In practice, for each right or left side of both rollers (R1, R2), said levers (303, 304, 310, 316) form two jaws acting along parallel planes spaced apart by a predetermined value (d).

With reference to the example shown in the attached drawings, the lower levers (303) and (308) exert an upward thrust (F1) on the bearings (105) adjacent to the end heads (T1, T2) of the lower roller (R2) and respectively a downward thrust (F2) on the outermost bearings (106) of the same roller (R2). The upper levers (310) and (316) exert an upward thrust (F3) on the outermost bearings (106) of the upper roller (R1) and, respectively, a thrust (F4) towards the rear side (P) of the calender on the bearings (105) adjacent to the end heads (T1, T2) of the same upper roller (R1).

Consequently, the bending of the rollers (R1, R2) is reduced. In fact, said forces (F1, F2, F3, F4) act on parallel and non-coincident planes.

With reference to the example shown in the attached drawings, inside each roller (R1, R2) there is a conduit (HT) to feed a heating fluid, such as a diathermic oil of the type normally available on the market. For example, a diathermic oil of the type indicated in table 1 below can be used, in which the letters A-E have the following meaning:
A: Manufacturer.
B: Type.
C: Viscosity at 40° C. (cSt or $mm^2/s$).
D: Viscosity at 100° C. (cSt or $mm^2/s$).
E: Density at 15° C. ($Kg/m^3$).
F: Self-ignition temperature (° C.).

TABLE 1

| A | B | C | D | E | F |
|---|---|---|---|---|---|
| AGIP | ALARIA 3 | 30 | 5.3 | 870 | 320 |
| BP | TRANSCAL N | 30.4 | 5.28 | 870 | 350 |
| ESSO | ESSOTHERM 500 | 30 | 5.2 | 860 | 300 |
| CHEM GROUP | MARLOTHERM N | 20 | 3.4 | 877 | 330 |

For example, the selected diathermic oil is introduced into the duct (HT) at a temperature comprised between 170° C. and 200° C. depending on the specific treatment to be carried out on the material (W) introduced between the rollers (R1, R2) of the calender.

Said conduit (HT) is arranged along the longitudinal axis of the roller (R1, R2) and has an inlet (107) formed in the second pin (102) of the roller. The inlet (107) of the conduit (HT) is equipped with a valve (108) through which the heating fluid can be introduced into the conduit (HT) and that also allows to close the inlet (107). The valve (108) is integral with the inlet (107) of the tube (HT), i.e. it is integral with the roller (R1, R2). In operating position, the valve (108) is open to allow the heating fluid to circulate in the conduit (HT), while it is closed when the roller (R1, R2) must be removed from the calender, as further described below. At a predetermined distance from each end head (T1, T2) a septum (S1, S2) is arranged such that, inside the roller (R1, R2) and near each end head, a corresponding chamber (C1, C2) is formed, with a first chamber (C1) more distant from the inlet (107) and a second chamber (C2) closer to said inlet. The conduit (HT) ends in the first chamber (C1), i.e. the outlet (109) of the conduit (HT) is in the first chamber (C1). The latter has multiple communication holes (110) with a heat exchanger (111) that is coaxial and external to the conduit (HT). The second chamber (C2) also has multiple communication holes (110) with the heat exchanger (111). A second conduit (RF) is provided in the second pin (102) to form a return line for the heating fluid. The second conduit (RF) is coaxial and external to the first conduit (HT), and has an inlet section (112) formed in the second end head (T2)

and an outlet section (113) on which a corresponding valve (114) is applied which allows the heating fluid to exit through the section (113) of the second conduit (RF) and also allows to block the same section (113). The valve (113) is integral with the outlet (113) of the conduit (RF), i.e. it is integral with the roller (R1, R2). In operating condition, the valve (113) is open to allow the heating fluid to pass through the second conduit (RF), while it is closed when the roller (R1, R2) must be removed from the calender.

Therefore, the heating fluid introduced at a predetermined pressure in the conduit (HT) through the inlet (107) fills the first chamber (C1), circulates in the heat exchanger (111), enters the second chamber (C2) and exits through the second conduit (RF). The inlet (107) of the fluid delivery duct (HT) and the outlet (113) of the return duct (RF) are connected, through the respective valves (108, 114), to a heating and fluid supply system known per se and not visible in the attached drawings.

In accordance with the example shown in the attached drawings, the second pin (102) is crossed by both the fluid delivery conduit (HT) and the return pipe (RF) for the heating fluid and the valves (108, 114) are both on the same side, being both arranged on the free end of the second pin (102). Furthermore, the valves (108, 114) have respective connections (180, 141) for their connection with the conduits (not visible in the drawings) provided for the supply and respectively for the evacuation of the heating fluid The jacket (100) of the roller (R1, R2) is coaxial and external to the heat exchanger (111) from which it receives the heat conveyed by the heating fluid.

For example, the heat exchanger (111) inside the roller (R1, R2) consists of a helical coil whose external diameter corresponds to the internal diameter of the jacket (100) to ensure a correct heat exchange. For example, said coil is formed by a helical-wound rectangular cross-section tube. In accordance with the example described, the heat exchanger (111) extends over the entire length of the roller (R1, R2), between the two end heads (T1, T2).

Preferably, on the end of the pin (102) is mounted a hydraulic joint formed by a hollow body (400) which has a first internal axial duct (401) in which are inserted a terminal part of the duct (HT) and a second duct (402), coaxial and external to the first (401), which constitutes an extension of the heating fluid return (RF) conduit. The conduit (401) ends with the valve (108), while the conduit (402) ends with the valve (114).

The body (400) of the joint is integral with the roller (R1, R2) and, by means of a respective appendix (403), is locked to the corresponding wall (11K) of the calender (1) when the roller is placed in the operating position. In this way, the valves (108, 114) are always in the same position during the rotation of the roller (R1, R2). In fact, the pin (102) rotates inside the joint (400) on which the valves (108, 114) are mounted.

Preferably, the aforementioned valves (108, 114) are applied on the side of the joint (400) which, in the operating position of the roller (R1, R2), faces the rear side (P) of the calender (1).

Figure 14B:
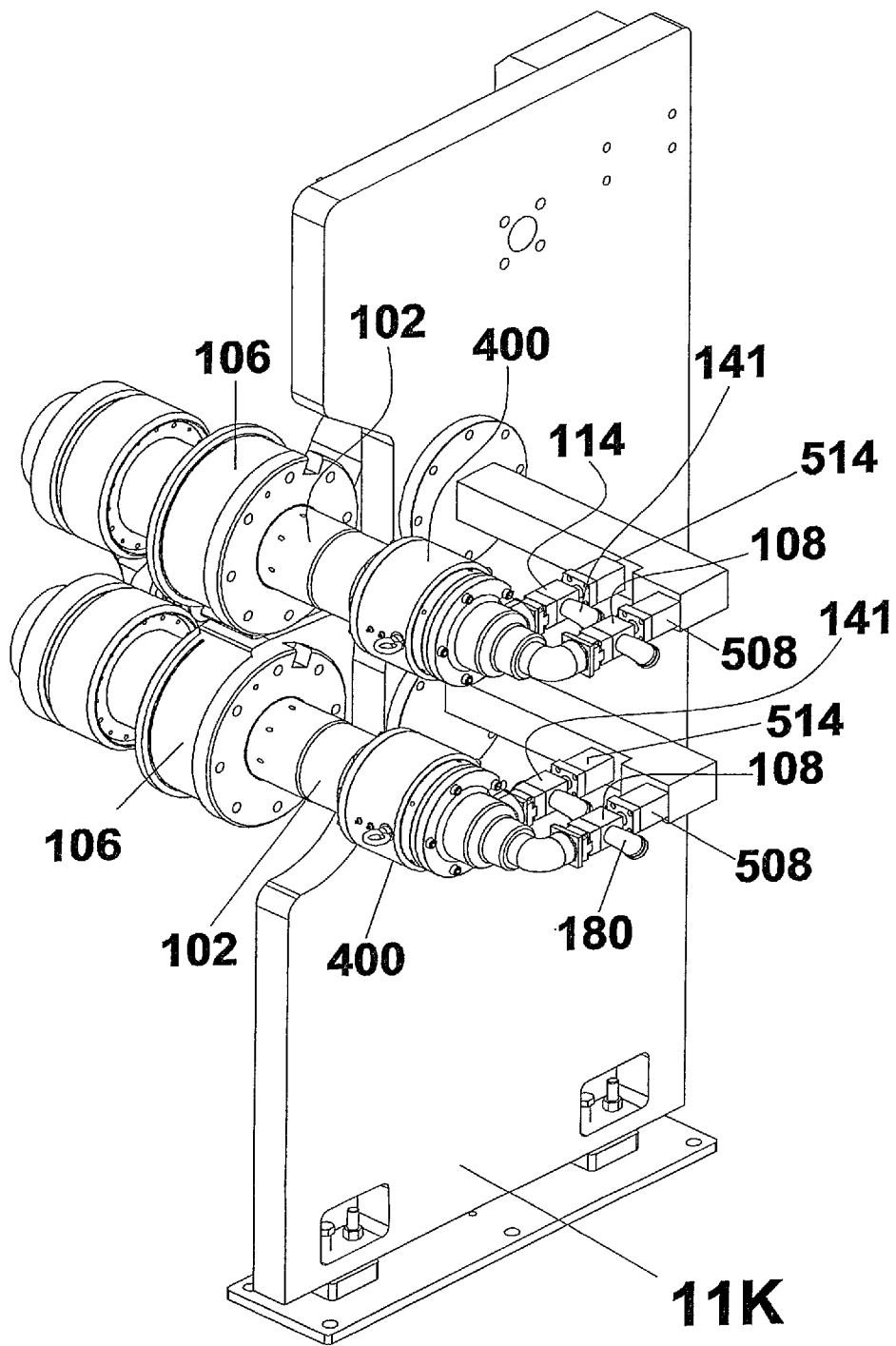
FIG. 14B is a detail of FIG. 12.
Figure 15:
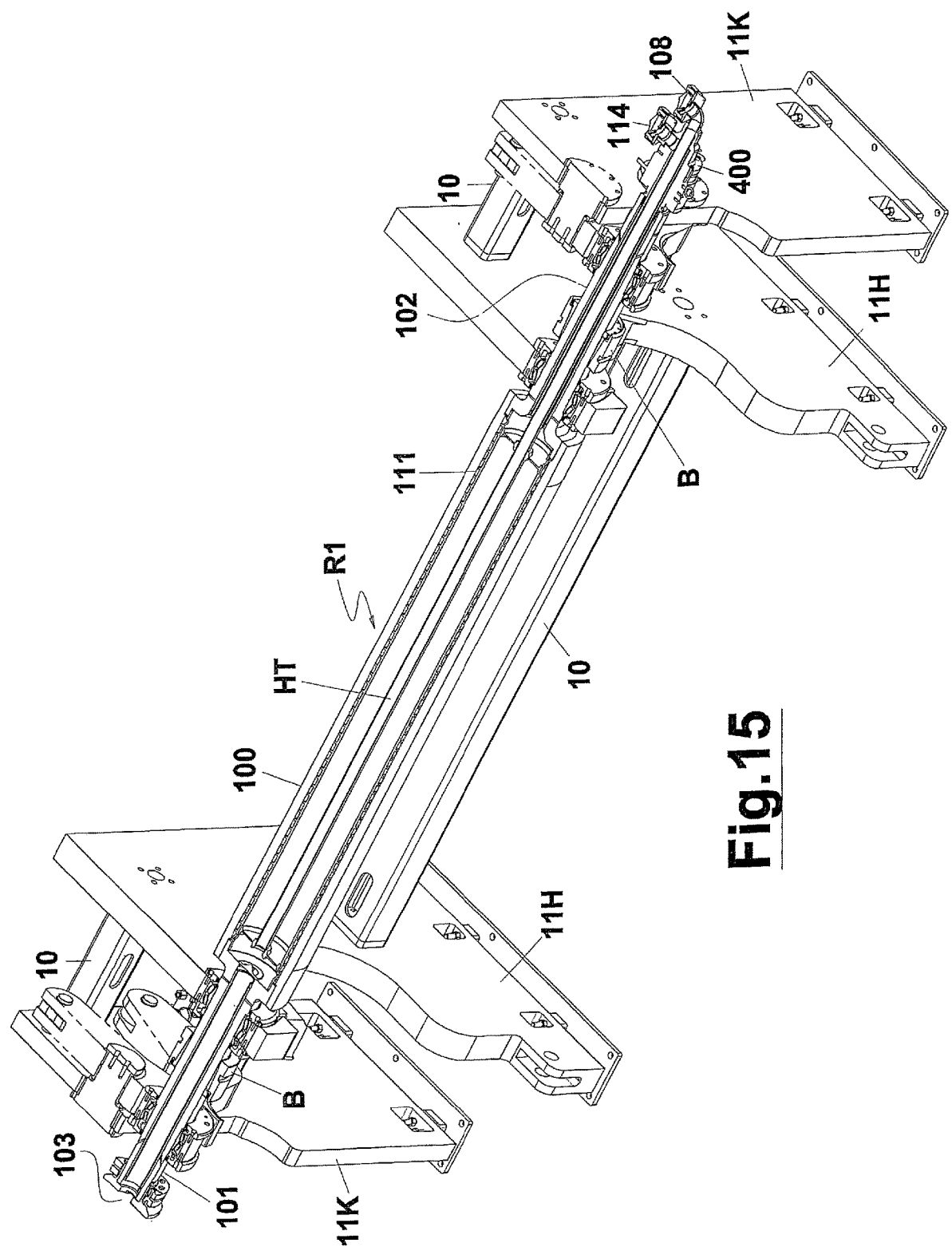
FIG. 15 represents a schematic horizontal section view of the group of FIG. 14 showing the internal structure of a roller.
Figure 16C:
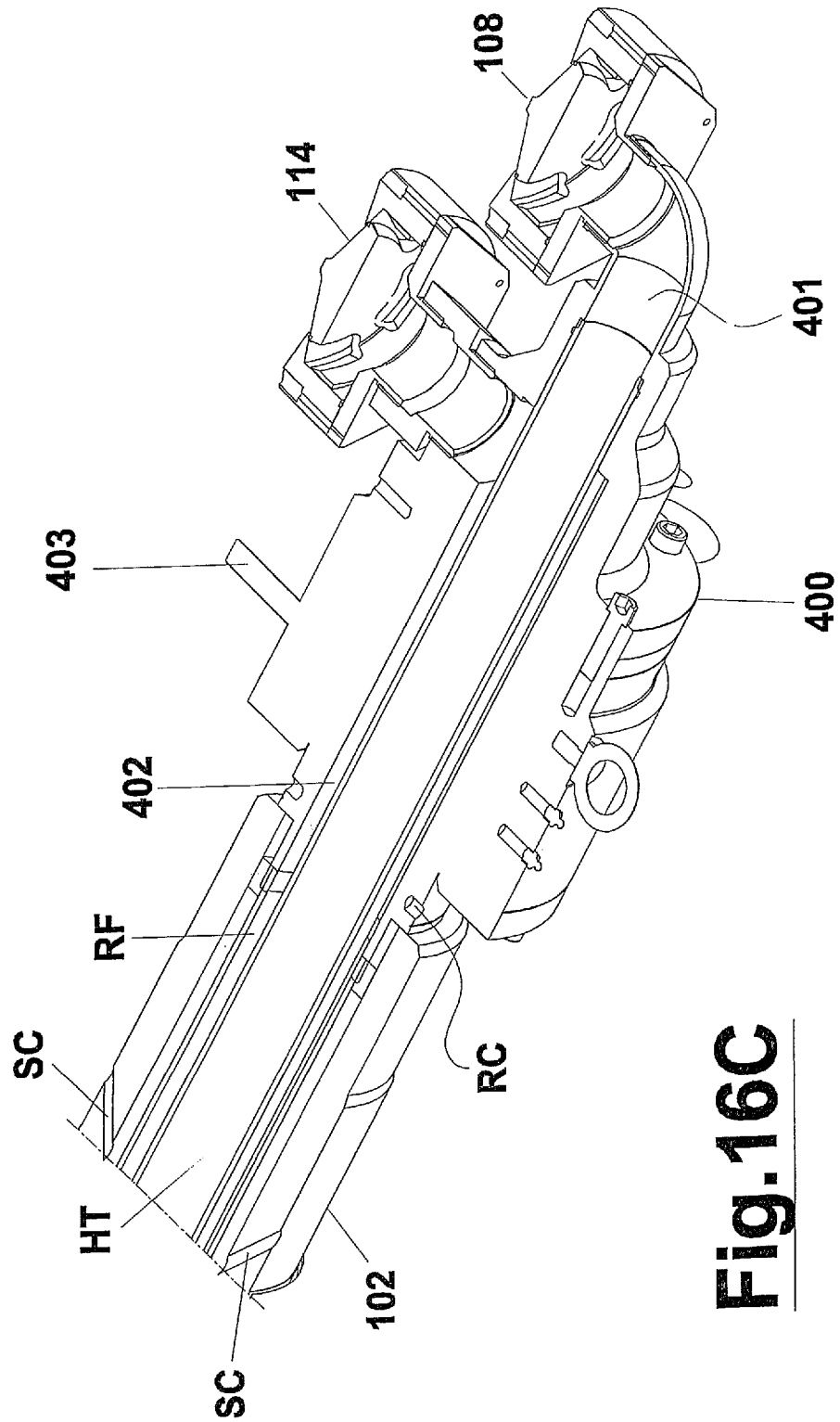
FIG. 16C is an enlarged detail of FIG. 15.
Figure 17:
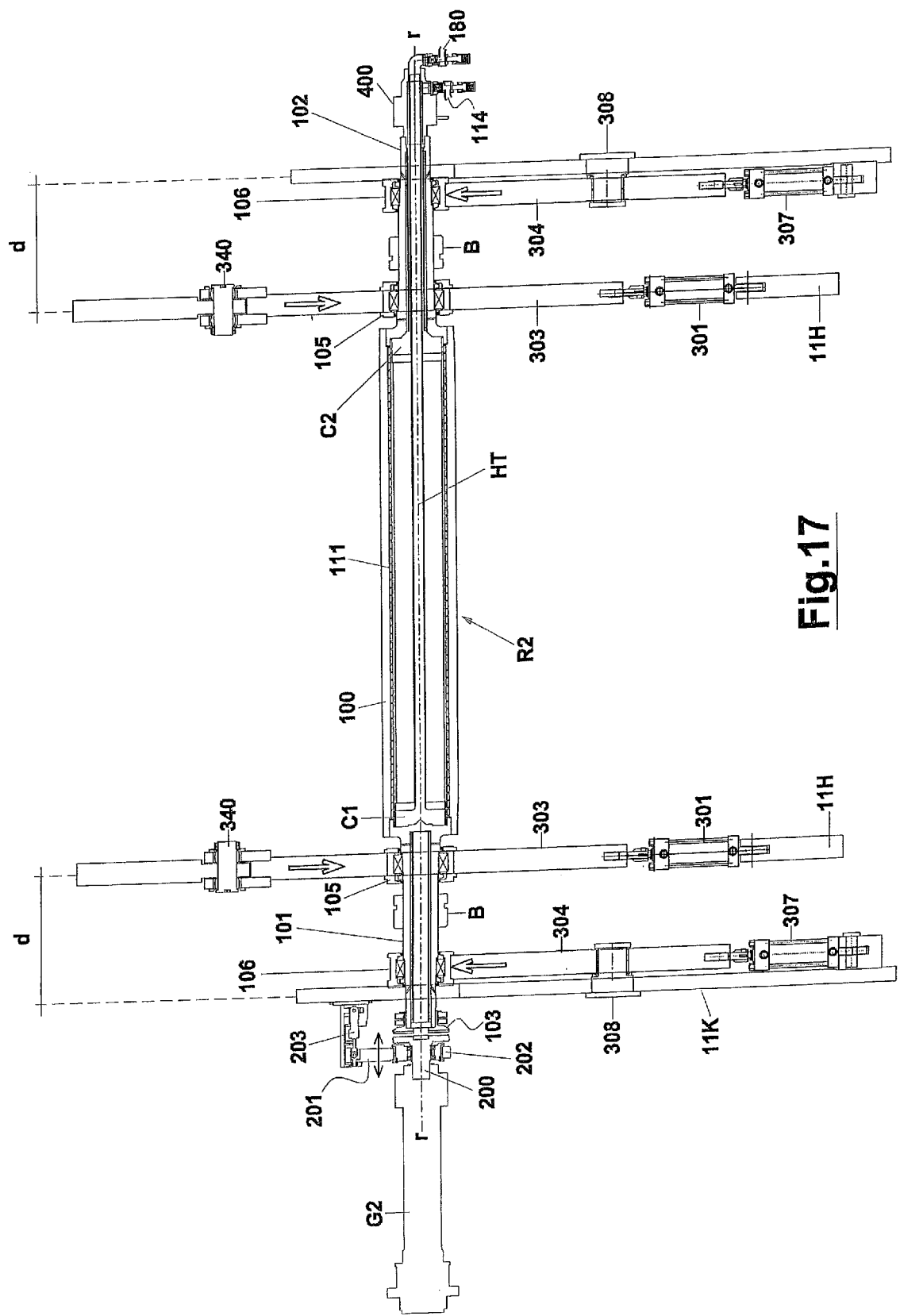
FIG. 17 represents a section view along the H-H line of FIG. 1.
Figure 20:
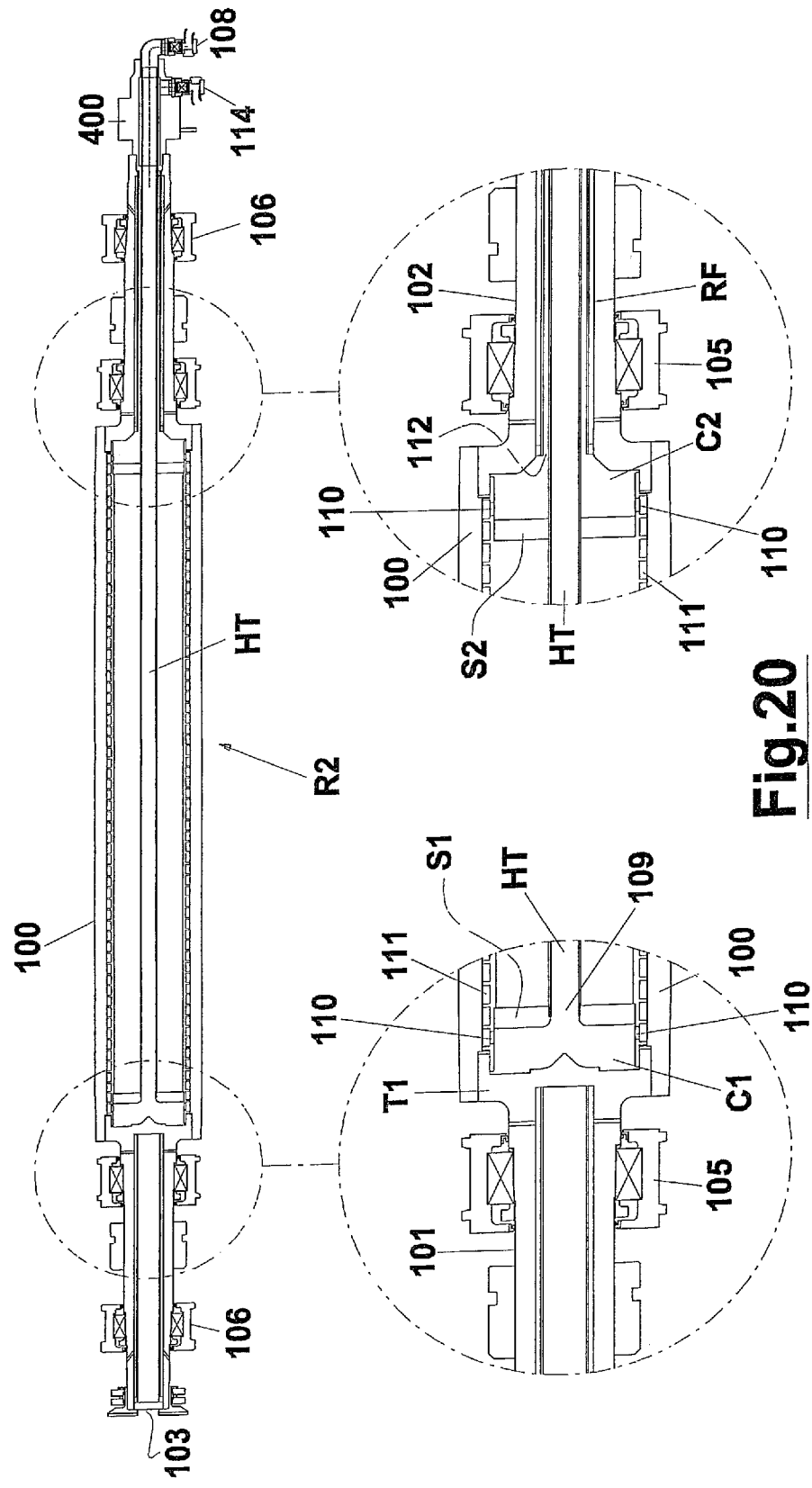
FIG. 20 represents a schematic horizontal section view of a roller, with two enlarged details.
Figure 21:
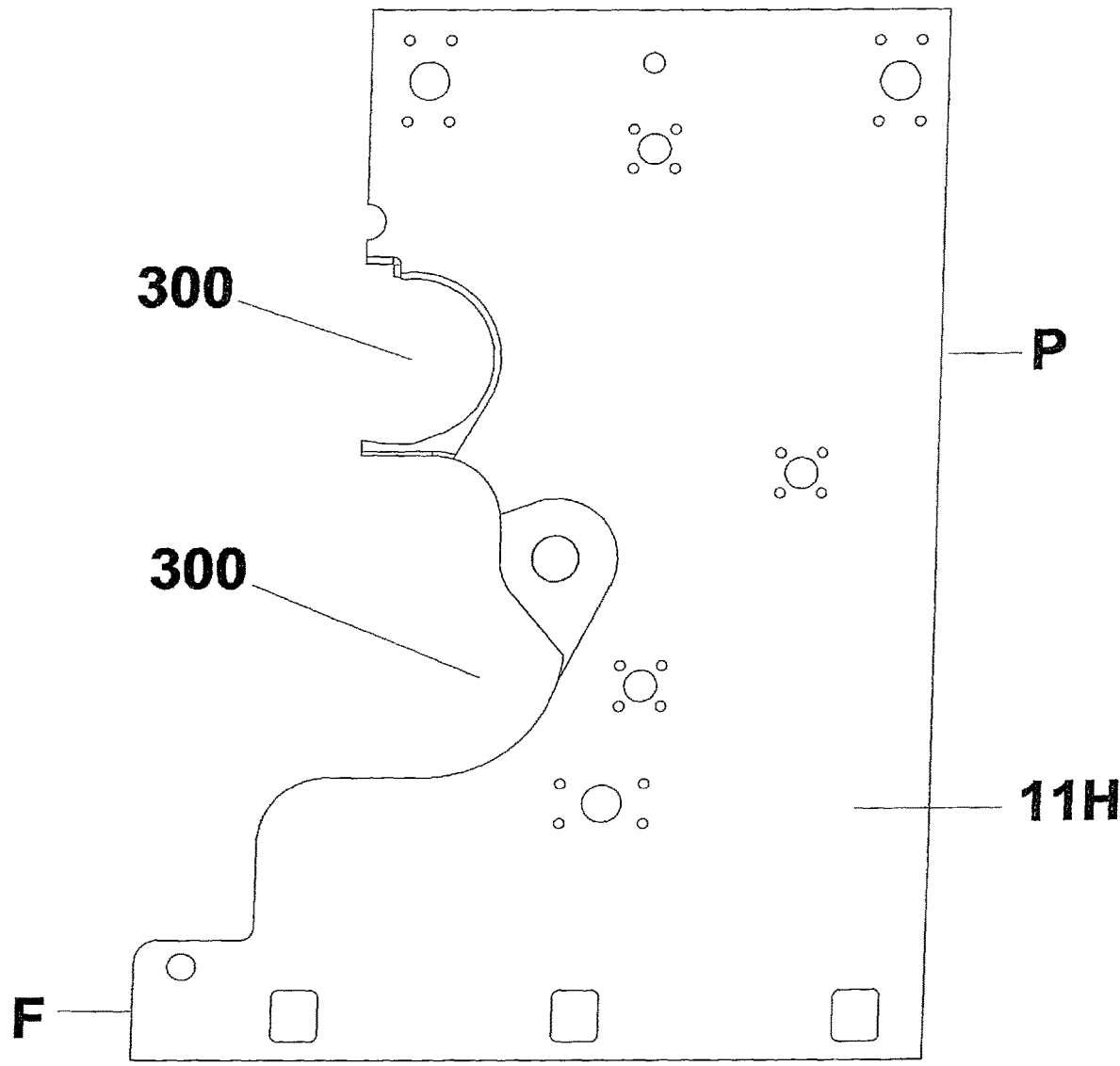
FIG. 21 is a side view of a vertical wall.
Figure 35:
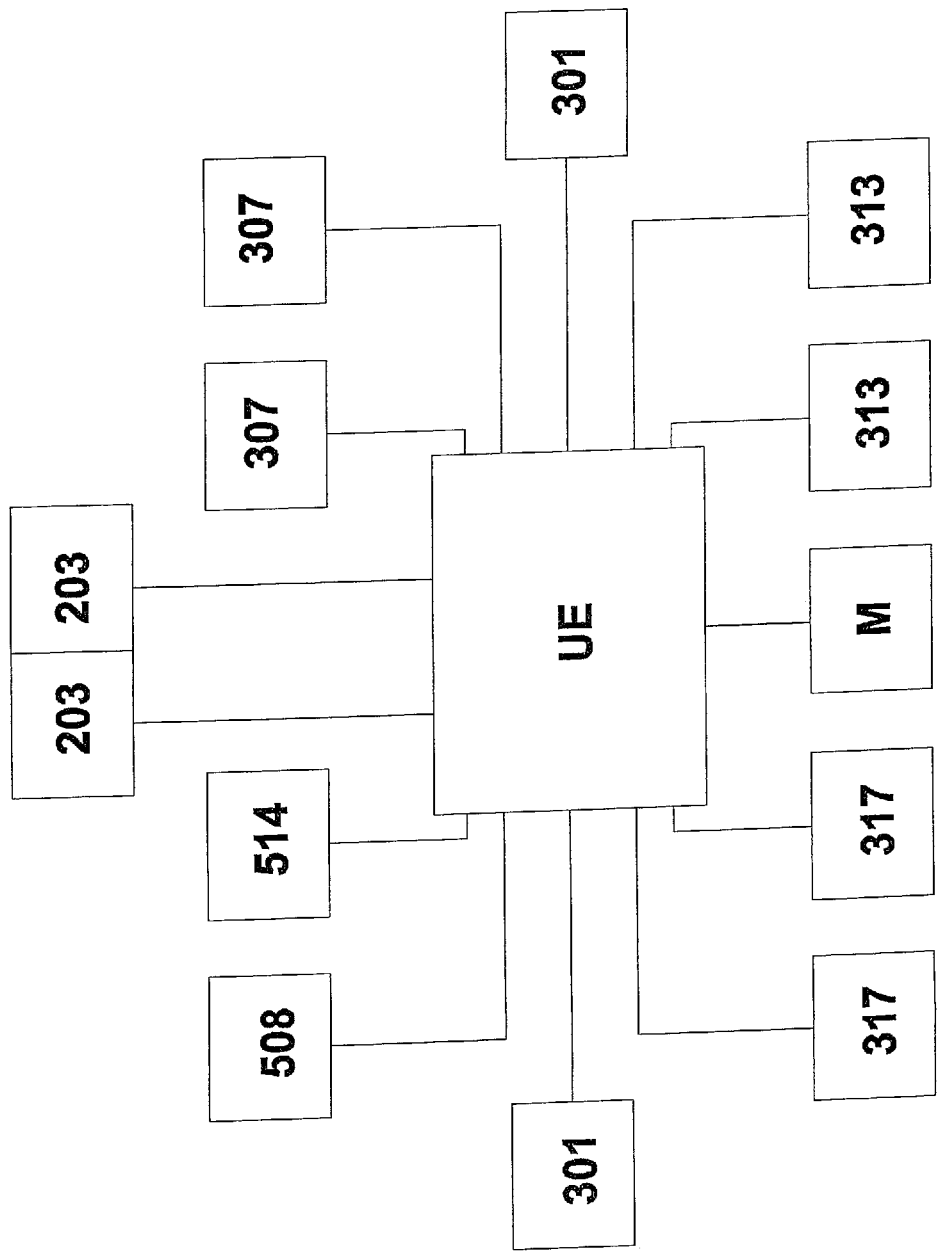
FIG. 35 is a simplified block diagram relating to a possible configuration of a control system for the actuators used for the operation of the calender shown in the previous figures.

The valves (108, 114) are normally closed and are opened by respective actuators (508, 514) mounted in predetermined positions on a side wall (11K) of the calender (1). With reference to the example shown in FIG. 14B, on the wall (11K) there are two pairs of actuators (508, 514), i.e. a pair of actuators (508, 514) for each roller (R1, R2). The operation of this part of the calender (1) is described below with reference to FIG. 19A and FIG. 19B which refer to a single valve (108) but it is understood that the operation is the same for all the valves, both the inlet (108) and the outlet (114) valves for the heating fluid: when introducing the heating fluid into the duct (HT), the piston (581) of the actuator (508) pushes on the front base (181) of the valve (108), whose movement is transmitted to the lower element (182) of the internal group (182, 184) by means of the bridge (183) which connects the lower element (182) of the group with the upper one (184), whereby the heating fluid is free to pass through the valve as indicated by the arrows "T" in FIG. 19A; vice versa, when the valve (108) must be closed, the piston of the actuator (508) is retracted as shown in FIG. 19B, such that the lower body (182) of the aforesaid group (182, 184) is spaced from the upper body (184), and the fluid cannot pass through the lower element (182), on which the connection (180) is inserted, and the escape of the fluid through the same connection (180) is prevented.

As particularly shown in FIGS. 22 and 23, each pin (101, 102) can be provided with an internal duct designed to allow air to pass through it in order to reduce its temperature and thus preserve the integrity of the bearings (105, 106). Therefore, the control of the operating temperature of the bearings (105, 106) can be performed without providing external cooling circuits as normally foreseen in the hot calenders. With reference to the example shown in FIG. 22 and FIG. 23, a channel (CC) parallel to the roller rotation axis (r-r) can be formed in each pin (101, 102). Said channel (CC) forms a thermally insulating chamber in the pin which isolates the bearings from the heat transmitted by the heating fluid. Possibly, air or even a thermally insulating material may be present in the duct (CC). As shown in the drawings, said channel (CC) develops under the bearings (105, 106).

Said channel (CC) can also be in communication with the outside through a first series of radial holes (RC) arranged near the respective end head (T1, T2), where the diameter of the pin is greater, and a second series of holes (SC) at a predetermined distance (a) from the first series of holes (RC), where the diameter of the pin is smaller. The axes of the holes of the second series (SC) converge on the rotation axis (r-r) of the roller, exhibiting an inlet more distant from the end head and an outlet closer to the latter. Said distance (a) is greater than the distance between the bearings (105, 106), so that the air flowing in the channel (CC) can cool both the bearings. As shown in FIG. 24, in the pin (102) on which the aforementioned valves are mounted (108, 114) the channel (CC) is coaxial and external to the fluid return duct (RF).

The external air enters the channel (CC) through the holes (SC) and exits through the radial holes (RC) resulting in adequate thermal insulation of the bearings (105, 106) of the rollers (R1, R2). FIG. 18C shows a nozzle (UR) which blows air in the direction of the holes (SC) to further facilitate, if required, the circulation of air through the channel (CC).

Preferably, the channel (CC) is arranged in both pins (101, 102) of the rollers (R1, R2) but it ducting could also be provided in the pin (102) only. In FIG. 22 also the pin (101) is provided with the cooling ducting formed by the channel (CC).

Advantageously, two bushes (B) are applied on each pin (101, 102) of the rollers (R1, R2), each of which is in an intermediate position between two corresponding bearings (105, 106) and is adapted to be engaged by the a bridge crane (CP) whose function is to move the rollers (R1, R2) between the calender (1) and one or more parking or waiting stations (S1, S2, S3) of the rollers as further described below. The bridge crane (CP) is external to the calender.

More specifically, with reference to FIGS. 25-34 of the attached drawings, to allow for example the removal of a roller (R1, R2) from the calender (1), the levers (303, 304, 310, 316) are rotated around the respective pins, each by the corresponding actuator (301, 307, 313, 317), so as to free the bearings (105, 106) and release the roller from the seats (300). In this phase, the connection of the roller with the drive unit is disengaged, freeing the respective power take-off (103), and the heating fluid supply is interrupted by closing the valves (108, 114) by means of the actuators (508, 514). The disengagement procedure of the roller to be removed by the bridge crane, as well as the procedure for closing the valves (108, 114) and the procedure for releasing the bearings (105, 106), is automatically managed by a programmable control unit (UE) that controls the actuators previously described. At this point, the arms (BC) of the bridge crane (CP), which at their free ends are shaped to be adapted to engage the bushings (B) of the rollers (R1, R2), approach the bushes (B) of the roller to be engaged and, by engaging said bushes, they pick up the roller and transport it to a destination station (S3), taking it to a structure where one or more rollers structured in the same way can be placed waiting to be used. FIGS. 25-28 schematically show the removal of a roller (R1) from the calender (1) by the bridge crane (CP), its transport to the destination structure (S3), and the release of the roller.

The pickup of the roller by the bridge crane (CP) takes place without waiting for the roller to cool down, the external surface of which, in this phase, generally can be at a temperature between 50° C. and 200° C. Therefore, the overall time required to perform the picking of a calender roller (1) is considerably reduced compared to traditional systems, in which the coupling of the rollers to a bridge crane is operated manually with the need to wait for the roller to be sufficiently cold to not cause burns to operators. The roller previously taken from the calender (1) can then be replaced with another roller located in a station (S2), possibly different from the previous one (S3), by means of the same bridge crane (CP) which, when positioning the new roller in the calender (1), will perform reverse movements with respect to the previous ones. After positioning the new roller in the calender (1), the levers (303, 304, 310, 316) are rotated around the respective pins, each by the corresponding actuator (301, 307, 313, 317), so as to engage the bearings (105, 106) of the new roller and constrain the latter to the destination seats (300). FIGS. 29-34 schematically show the removal of a new roller from a station (S2), the transport of this roller to the calender (1) and the repositioning of the bridge crane (CP) in the waiting position. In FIGS. 25-34 the reference "CF" represents a cooling unit provided with cold rollers, of the type normally used to cool the material (W) coming out of a hot calender.

The bushes (B) arranged on the pins (101, 102) of the rollers (R1, R2) form an engagement surface adapted to be engaged by mechanical means for moving the rollers (R1, R2) between the calender (1) and one or more waiting or parking stations (S1, S2, S3) while the rollers are at a temperature comprised between 50° C. and 200° C. after being released from said structure, disconnected from said drive unit and disconnected from said heating system by said automatic means controlled by the programmable control unit (UE). In the example previously described, the mechanical means for moving the rollers are made up of a bridge crane (CP) but any other movement system suitable for engaging the rollers at said engagement surface can be used in place of the bridge crane (CP). Likewise, the engagement surface (B) can be of any shape. Preferably, said engagement surface (B) is formed by a bush fitted on a respective pin but it can also be an engagement surface directly formed on the pin. Preferably, to facilitate the intervention of the mechanical means for handling the rollers (R1, R2), said shaped surface is in an intermediate position between two corresponding bearings (105, 106) but it can be equally arranged in any useful position to allow its engagement by said mechanical handling means.

A calender in accordance with the present invention is adapted to be installed in a plant which as described above, in addition to including the calender itself, further comprises mechanical means, for example the aforementioned bridge crane (CP), suitable for moving the rollers (R1, R2) between the calender (1) and one or more waiting or parking stations (S1, S2, S3) while the rollers are at a temperature comprised between 50° C. and 200° C. In practice, the details of execution can however vary in an equivalent manner as regards the individual elements described and illustrated and their mutual arrangement, without thereby departing from the idea of the solution adopted and therefore remaining within the limits of the protection conferred by this patent in accordance with the following claims.

The invention claimed is:

1. A calender for the treatment of web-like materials, comprising: a fixed structure supporting two heated rollers reciprocally arranged so as to form a nip traversable by web-like materials, wherein each of the rollers has a right pin and a left pin and on each of the right pin and the left pin are mounted two bearings spaced apart from each other by a predetermined value, and wherein said structure comprises two lower levers and two upper levers, each of the lower and upper levers movable so as to come into contact with a respective bearing of the bearings, such that each of the lower and upper levers exerts on the respective bearing a force that is oriented in a direction not coinciding with directions of forces exerted on others of the bearings, each of the lower and upper levers being connected with a respective actuator that controls a rotation of a respective one of the levers around a respective horizontal axis of the respective lever to put the respective lever in a first engagement position of the respective bearing of the bearings and in a second release position, such that in the second position of each of the lower and upper levers the extraction of each of the rollers from the calender is allowed.

2. The calender according to claim 1, wherein each lever of the upper and lower levers has a concave part interacting with the respective bearing in the first engagement position.

3. The calender according to claim 1, wherein each lever of the upper and lower levers is connected to one side wall of a plurality of side walls of said structure, said side walls being arranged so as to form a pair of internal side walls and a pair of external side walls.

4. The calender according to claim 3, wherein on each of the external side walls are applied:
a first lower lever, of the two lower levers, controlled by the respective actuator that controls rotation of the first lower lever around a first lower pin with a horizontal axis, the first lower lever being connected to the respective external wall by the first lower pin, and a free front end of the first lower lever being concave with the concavity facing downwards; and
a first upper lever, of the two upper levers, controlled by the respective actuator that controls rotation of the first upper lever around a first upper pin with a horizontal axis, the first upper lever being connected to the respective external wall by the first upper pin, and a free front end of the first upper lever being concave with the concavity facing upwards;

and wherein on each of the internal side walls are applied:
- a second lower lever, of the two lower levers, controlled by the respective actuator that controls rotation of the second lower lever around a second lower pin with a horizontal axis, the second lower lever being connected to the respective internal wall by the second lower pin, and an intermediate part of the second lower lever being concave with the concavity facing upwards; and
- a second upper lever, of the two upper levers, controlled by the respective actuator that controls rotation of the second upper lever around a second upper pin with a horizontal axis, the second upper lever being connected to the respective internal wall by the second upper pin, and a front part of the second upper lever being concave with the concavity facing a rear part of the internal side wall when the calender is in an operating position.

5. The calender according to claim 1, wherein each of the respective actuators is controlled by a programmable unit that controls an actuation of the respective actuators to automatically control movement of the respective levers.

6. The calender according to claim 1, wherein one of the right pin and the left pin of each of the rollers is provided with a power take-off connected to a drive unit by a joint having a side connected with said power take-off by an actuator, which actuator also controls a disengagement of said joint, said joint being connected to an electric motor, said actuator being controlled by a programmable unit that controls an actuation of the actuator to automatically control the connection of the joint to the power take-off and respectively the disengagement.

7. The calender according to claim 6, wherein each of the actuators is mounted on a side wall of said fixed structure.

8. The calender according to claim 1, wherein both said rollers are provided with internal ducts in which a heating fluid circulates, on said ducts respective valves being provided, an opening and closing of the valves being controlled by respective valve actuators controlled by a programmable unit that controls an actuation of the valve actuators to automatically control the opening and closing of the respective valves.

9. The calender according to claim 8, wherein said valve actuators are mounted on a side wall of said fixed structure.

10. The calender according to claim 8, wherein said valves are arranged on a same one of said pins.

11. The calender according to claim 1, wherein each of said rollers has, at an intermediate position between the bearings of each of the respective pins, a bush engageable by mechanical means for moving the rollers.

12. The calender according to claim 11, wherein said mechanical means for moving the rollers comprise a bridge crane external to the calender.

13. The calender according to claim 11, wherein said mechanical means transfer the rollers between the calender and one or more waiting or parking stations while the rollers are at a temperature comprised between 50° C. and 200° C.

14. The calender according to claim 1, wherein at least one of the right pin and the left pin of each of the rollers is provided with an internal channel which delimits a thermally insulating chamber extending through the respective bearings.

15. The calender according to claim 14, wherein, in each of said internal channels, air circulates through a first series of holes communicating with an outside of the internal channels and formed near an end head of a respective one of the rollers and through a second series of external holes formed at a predetermined distance from the first series.

16. The calender according to claim 15, wherein the holes of the first series are radial holes and the holes of the second series are holes whose axes converge on the axis of rotation of the respective rollers, the holes of the second series of holes having an inlet located at a greater distance from a respective one of the end heads of the respective roller and an exit located at a closer distance to the respective end head.

17. The calender according to claim 15, wherein the holes of the first series are formed in an area of a respective pin of said pins, the area having a greater diameter than an area of the respective pin where the holes of the second series are formed.

18. The calender according to claim 14, wherein said internal channels are each coaxial and external to internal ducts provided within each of the rollers and in which a heating fluid circulates.

* * * * *